United States Patent
Ye et al.

(10) Patent No.: US 12,143,839 B2
(45) Date of Patent: Nov. 12, 2024

(54) INTERFERENCE MEASUREMENT METHOD AND APPARATUS

(71) Applicant: Huawei Technologies Co., Ltd., Shenzhen (CN)

(72) Inventors: Feng Ye, Shenzhen (CN); Xiaoyong Tang, Shenzhen (CN); Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 735 days.

(21) Appl. No.: 17/213,999

(22) Filed: Mar. 26, 2021

(65) Prior Publication Data

US 2021/0219155 A1 Jul. 15, 2021

Related U.S. Application Data

(63) Continuation of application No. PCT/CN2019/108123, filed on Sep. 26, 2019.

(30) Foreign Application Priority Data

Sep. 28, 2018 (CN) .......................... 201811143470.8

(51) Int. Cl.
*H04W 24/08* (2009.01)
*H04L 5/00* (2006.01)
*H04W 72/541* (2023.01)

(52) U.S. Cl.
CPC ........... *H04W 24/08* (2013.01); *H04L 5/0048* (2013.01); *H04W 72/541* (2023.01)

(58) Field of Classification Search
CPC ............. H04W 24/08; H04W 28/0236; H04W 72/541; H04L 5/0048
See application file for complete search history.

(56) References Cited

U.S. PATENT DOCUMENTS

| | | | |
|---|---|---|---|
| 2016/0105248 A1* | 4/2016 | Lunttila | H04B 17/345 |
| | | | 370/252 |
| 2020/0052775 A1* | 2/2020 | Nam | H04L 5/14 |
| 2020/0107309 A1* | 4/2020 | Akoum | H04W 72/046 |

FOREIGN PATENT DOCUMENTS

| | | |
|---|---|---|
| CN | 108023701 A | 5/2018 |
| WO | 2014181154 A1 | 11/2014 |

OTHER PUBLICATIONS

Huawei et al. "Consideration on cross-link interference in IAB", 3GPP TSG RAN WG1 Meeting #94, R1-1808088, Gothenburg, Sweden, Aug. 20-24, 2018, 8 pages.
Huawei et al. "On CLI measurement and power control for cross-link interference mitigation", 3GPP TSG RAN WG1 Meeting #88bis, R1-1704255, Spokane, WA, US, Apr. 3-7, 2017, 7 pages.
Intel Corporation, "PHY layer enhancements for NR IAB", 3GPP TSG RAN WG1 #94, R1-1808691, Gothenburg, Sweden, Aug. 20-24, 2018, 13 pages.

* cited by examiner

Primary Examiner — Kent Krueger
(74) Attorney, Agent, or Firm — Slater Matsil, LLP

(57) ABSTRACT

This application provides an interference measurement method and apparatus. A second functional entity of an interference-generating node sends, by using one or more beams corresponding to a reference signal resource identifier of a first functional entity of the interference-generating node, a reference signal used for interference measurement, so that an interfered node can perform interference measurement.

20 Claims, 17 Drawing Sheets

INTERFERENCE MEASUREMENT METHOD AND APPARATUS

CROSS-REFERENCE TO RELATED APPLICATIONS

This application is a continuation of International Application No. PCT/CN2019/108123, filed on Sep. 26, 2019, which claims priority to Chinese Patent Application No. 201811143470.8, filed on Sep. 28, 2018. The disclosures of the aforementioned applications are hereby incorporated by reference in their entireties.

TECHNICAL FIELD

This application relates to the communications field, and more specifically, to an interference measurement method and apparatus.

BACKGROUND

In a 5th generation communications system (5th generation mobile networks or 5th generation wireless systems, 5G), an integrated access and backhaul (IAB) node is an evolved node in a relay technology. In a wireless communications network, a relay node is usually used to implement extended coverage or blind spot coverage, or to improve a system capacity. The IAB node is functionally divided into an IAB mobile termination (MT) and an IAB base station distributed unit (DU). The IAB MT means that the IAB node accesses an upper-level node as a terminal device UE. The IAB DU means that the IAB node provides an access service for UE and another downstream node as a base station distributed unit.

When the IAB node accesses a network, a link through which the IAB DU provides a service for the UE is referred to as an access link (AC), and a link through which the IAB DU sends data to another IAB node is referred to as a backhaul link (BH). Because scheduling results are different at different IAB nodes, different IAB nodes may have different receiving and sending statuses at a same moment. For example, when receiving a signal transmitted on the backhaul link or the access link, an IAB node receives interference from a signal sent by another IAB node, and the interference is referred to as cross link interference (CLI). The cross link interference reduces a transmission capability of the IAB node, especially interference to the backhaul link, resulting in a severe performance loss. Therefore, how to perform interference measurement on the IAB node and then take a targeted interference management measure to avoid cross link interference or mitigate impact of cross-link signal transmission is a problem that needs to be considered in current IAB standardization.

SUMMARY

In view of the above, this application provides an interference measurement method and apparatus. A second functional entity of an interference-generating node sends, by using one or more beams corresponding to a reference signal resource identifier of a first functional entity of the interference-generating node, a reference signal used for interference measurement, so that an interfered node can quickly and accurately perform interference measurement. In this way, interference measurement between nodes under cross link interference is implemented, thereby greatly reducing impact of cross-link signal transmission and improving transmission performance of a system.

According to a first aspect, an interference measurement method is provided, and is applied to an integrated access and backhaul IAB network. The IAB network includes at least a first node and a second node, and the second node includes a first functional entity and a second function entity. The method includes the following steps.

The second functional entity of the second node receives an RS configuration message, where the RS configuration message includes reference signal resource indication information of the second functional entity of the second node, and the reference signal resource indication information of the second functional entity includes a reference signal resource identifier of the first functional entity of the second node; and the second functional entity of the second node sends, based on the reference signal resource identifier of the first functional entity of the second node in the received RS configuration message, a reference signal used for interference measurement.

According to the foregoing embodiment, a second functional entity of an interference-generating node sends, by using one or more beams corresponding to a reference signal resource identifier of a first functional entity of the interference-generating node, a reference signal used for interference measurement, so that an interfered node can quickly and accurately perform interference measurement, thereby greatly reducing impact of cross-link signal transmission and improving transmission performance of a system.

According to a second aspect, an interference measurement method is provided, and is applied to an integrated access and backhaul IAB network. The IAB network includes at least a first node, a second node, and a third node, and the second node and the third node each include a first functional entity and a second function entity. The method includes the following steps.

The first functional entity of the third node receives an interference measurement configuration message, where the interference measurement configuration message includes interference measurement type indication information, and the interference measurement type indication information is used to indicate the first functional entity of the third node to perform interference measurement by using a receive beam of the second functional entity of the third node; and the first functional entity of the third node determines, according to the interference measurement type indication in the interference measurement configuration message, that a receive beam used for detecting a reference signal is the receive beam of the second functional entity of the third node; and the first functional entity of the third node receives, by using the determined receive beam, a reference signal used for interference measurement.

According to the interference measurement method provided in the foregoing embodiment, an interfered node can quickly and accurately perform interference measurement, thereby greatly reducing impact of cross-link signal transmission and improving transmission performance of a system.

According to a third aspect, an interference measurement apparatus is provided, including: a transceiver, configured to: receive an RS configuration message, where the RS configuration message includes reference signal resource indication information of a second functional entity of a second node, and the reference signal resource indication information of the second functional entity includes a reference signal resource identifier of a first functional entity of the second node; and send, by using determined one or more transmit beams according to an indication of a processor, an RS used for interference measurement; and the processor, configured to: determine, based on the reference signal resource identifier of the first functional entity of the second node in the RS configuration message, the one or more transmit beams corresponding to the reference signal resource identifier of the first functional entity of the second node, and indicate the transceiver to send, by using the determined transmit beam, the RS used for interference measurement.

According to the interference measurement apparatus provided in the foregoing embodiment, an interfered node can quickly and accurately perform interference measurement, thereby greatly reducing impact of cross-link signal transmission and improving transmission performance of a system.

According to a fourth aspect, an interference measurement apparatus is provided, including: a transceiver, configured to: receive an interference measurement configuration message, where the interference measurement configuration message includes interference measurement type indication information, and the interference measurement type indication information is used to indicate a first functional entity of a third node to perform interference measurement by using a receive beam of a second functional entity of the third node; and receive, by using the determined receive beam according to an indication of a processor, a reference signal used for interference measurement; and the processor, configured to: determine, according to the interference measurement type indication in the interference measurement configuration message, that a receive beam used for detecting the reference signal is the receive beam of the second functional entity of the third node, and indicate the transceiver to receive, by using the determined receive beam, the reference signal used for interference measurement.

According to the interference measurement apparatus provided in the foregoing embodiment, an interfered node can quickly and accurately perform interference measurement, thereby greatly reducing impact of cross-link signal transmission and improving transmission performance of a system.

According to a fifth aspect, an interference measurement apparatus is provided, including: a memory, configured to store a program; and a processor, configured to execute the program stored in the memory, where when the program is executed, the processor is configured to perform the method in either the first aspect or the second aspect.

According to a sixth aspect, an interference measurement apparatus is provided, including: a computer readable storage medium, including an instruction, where when the instruction is executed on a computer, the computer is enabled to perform the method in either the first aspect or the second aspect.

According to a seventh aspect, an interference measurement apparatus is provided, including a computer program product. The computer program product includes computer program code, and when the computer program code is executed on a computer, the computer is enabled to perform the method in either the first aspect or the second aspect.

According to an eighth aspect, a chip is provided, including a memory and a processor. The memory is configured to store a computer program, and the processor is configured to invoke the computer program from the memory and execute the computer program, so that the processor is enabled to perform the method in either the first aspect or the second aspect.

DETAILED DESCRIPTION OF ILLUSTRATIVE EMBODIMENTS

The following describes technical solutions of this application with reference to accompanying drawings.

Figure 1:
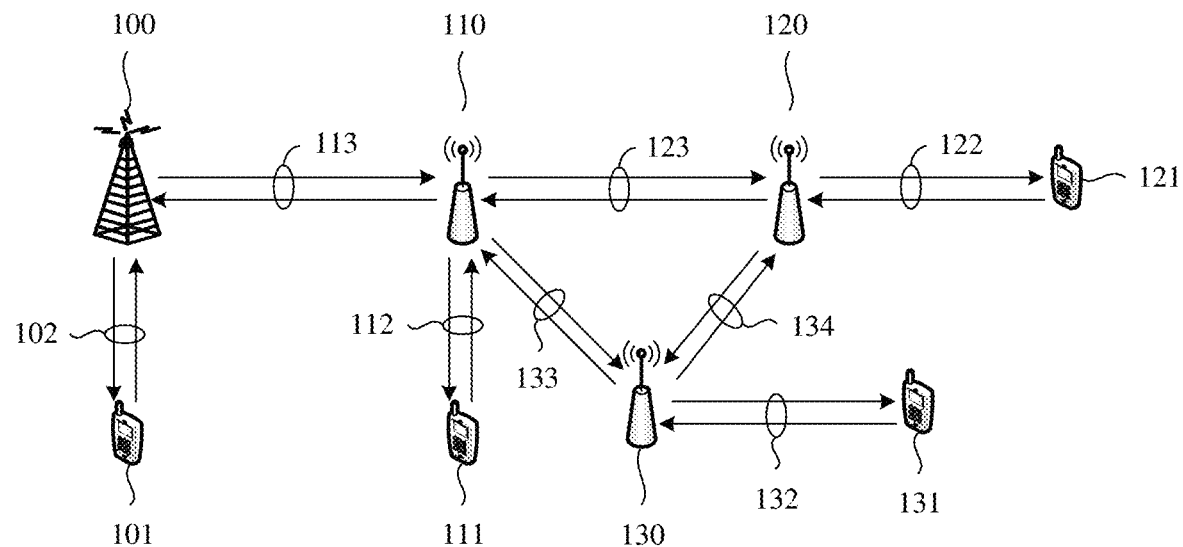
FIG. 1 is a diagram of a system architecture to which an embodiment of this application is applied.

FIG. 1 is a schematic diagram of a communications system according to an embodiment of this application. As shown in FIG. 1, the communications system includes a network device and at least one terminal device. The terminal device is within coverage of the network device and communicates with the network device, to implement the technical solutions provided in the following embodiments of this application. The communications system in this embodiment may be applied to a multi-TRP scenario.

The embodiments of this application are described with reference to the network device and the terminal device. The network device and the terminal device may work on a licensed frequency band or an unlicensed frequency band.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in a wireless local area network (WLAN), and may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or a terminal device in an NR system.

By way of example but not limitation, in the embodiments of this application, the terminal device may be alternatively a wearable device. The wearable device may also be referred to as a wearable intelligent device, which is a collective name of wearable devices, such as glasses, gloves, watches, clothes, and shoes, obtained after a wearable technology is used for intelligent design and development of daily wear. The wearable device is a portable device that is directly worn or integrated into clothes or an accessory of a user. The wearable device not only is a hardware device, but also implements strong functions through software support, data exchange, and cloud exchange. Generic wearable intelligent devices include a large full-featured wearable device, such as a smartwatch or smart glasses, capable of implementing all or some functions without relying on a smartphone; and a wearable device, such as various smart bands performing vital sign monitoring and smart jewelry, that concentrates only on a particular type of application function and needs to be used together with another device such as a smartphone.

In addition, the network device is also referred to as a radio access network (RAN) device and is a device that connects the terminal device to a wireless network, and may be an evolved NodeB (eNB or eNodeB), a relay station, or an access point in long term evolution (LTE), a network device in a 5G network, a network device in a future evolved PLMN network, a new generation NodeB (gNodeB) in an NR system, or the like. This is not limited herein.

In addition, in the embodiments of this application, the network device serves a cell, and the terminal device communicates with the network device by using a transmission resource (for example, a frequency domain resource or a spectrum resource) used in the cell. The cell may be a cell corresponding to the network device (for example, a base station), and the cell may belong to a macro base station, or may be a base station corresponding to a small cell. The small cell herein may include a metro cell, a micro cell, a pico cell, a femto cell, and the like. These small cells are characterized by small coverage and low transmit power, and are applicable to providing of a high-rate data transmission service.

FIG. 1 is a schematic structural diagram of a communications system to which embodiments of this application are applied.

It should be noted that the communications system mentioned in the embodiments of this application includes but is not limited to a narrowband internet of things (NB-IoT) system, a long term evolution (LTE) system, a next-generation 5G mobile communications system, a communications system after 5G, or a device to device (D2D) communications system.

In the communications system shown in FIG. 1, an integrated access and backhaul IAB system is provided. One IAB system includes at least one base station 100, one or terminals 101 served by the base station 100, one or more relay nodes (rTRP) 110, and one or more terminals 111 served by the rTRP 110. Generally, the base station 100 is referred to as a donor next generation NodeB (DgNB), and the rTRP 110 is connected to the base station 100 over a wireless backhaul link 113. In this application, the terminal is also referred to as a termination, and the donor next generation NodeB is also referred to as a donor node, namely, a Donor node. The base station includes but is not limited to an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), a next-generation new radio NodeB (for example, a gNB), or the like.

The integrated access and backhaul system may further include a plurality of other relay nodes such as an rTRP 120 and an rTRP 130. The rTRP 120 is connected to the relay node rTRP 110 over a wireless backhaul link 123 to access a network, the rTRP 130 is connected to the relay node rTRP 110 over a wireless backhaul link 133 to access the network, the rTRP 120 serves one or more terminals 121, and the rTRP 130 serves one or more terminals 131. In FIG. 1, the relay nodes rTRP 110 and rTRP 120 are both connected to the network over a wireless backhaul link. In this application, the wireless backhaul link is described from a perspective of a relay node. For example, the wireless backhaul link 113 is a backhaul link of the relay node rTRP 110, and the wireless backhaul link 123 is a backhaul link of the relay node rTRP 120. As shown in FIG. 1, a relay node such as the relay node 120 may be connected to another relay node 110 over a wireless backhaul link such as the wireless backhaul link 123, so as to be connected to the network. In addition, the relay node may be connected to the network by using a multi-level wireless relay node.

Generally, a node that provides a wireless backhaul link resource, for example, the relay node 110, is referred to as an upper-level node of the relay node 120, and the relay node 120 is referred to as a lower-level node of the relay node 110. Generally, a lower-level node may be considered as a terminal of an upper-level node. It should be understood that, in the integrated access and backhaul system shown in FIG. 1, one relay node is connected to one upper-level node. However, in a future relay system, to improve reliability of a wireless backhaul link, a plurality of upper-level nodes may simultaneously serve one relay node such as the relay node 120. For example, the rTRP 130 in the figure may also be connected to the relay node rTRP 120 over a backhaul link 134. In other words, both the rTRP 110 and the rTRP 120 are upper-level nodes of the rTRP 130. In this application, the terminals 101, 111, 121, and 131 may be stationary or mobile devices. For example, the mobile device may be a mobile phone, an intelligent terminal, a tablet computer, a notebook computer, a video game console, a multimedia player, or even a mobile relay node. The stationary device is usually located at a fixed location, for example, a computer or an access point (connected to the network over a wireless link, such as a stationary relay node). The name of the relay node rTRP 110, 120, or 130 does not limit a deployment scenario or network, and may be any other name such as a relay or an RN. The use of the rTRP in this application is merely a requirement for ease of description.

One or more relay nodes rTRPs 110 may also be referred to as IAB nodes. Each IAB node includes two function entities: a distributed unit (DU) and a mobile termination. Similar to a function of UE, the functional entity MT receives downlink data from an upper-level node (a donor node or an IAB node) or sends uplink data to an upper-level node. Similar to a function of a base station, the functional entity DU sends downlink data to a lower-level node (an IAB node or a mobile termination) or receives uplink data sent by a lower-level node. For example, for the IAB system provided in FIG. 2, the IAB system includes one donor node and three IAB nodes: an IAB node 1, an IAB node 2, and an IAB node 3. The IAB node 2 and the IAB node 3 are directly connected to the donor node, the IAB node 1 is a subnode of the IAB node 3, and the donor node and each IAB node separately serve one or more user UE nodes, for example, UE1, UE2, UE3, and UE4.

In FIG. 1, radio links 102, 112, 122, 132, 113, 123, 133, and 134 may be bidirectional links, including uplink and downlink transmission links. Particularly, the radio backhaul links 113, 123, 133, and 134 may be used by an upper-level node to serve a lower-level node. For example, an upper-level node 100 provides a wireless backhaul service for a lower-level node 110. It should be understood that an uplink and a downlink of a backhaul link may be separated, that is, transmission on the uplink and the downlink is not performed by using a same node. The downlink transmission means that an upper-level node such as the node 100 transmits information or data to a lower-level node such as the node 110, and the uplink transmission means that a lower-level node such as the node 110 transmits information or data to an upper-level node such as the node 100. The node is not limited to a network node or a terminal. For example, in a D2D scenario, the terminal may serve another terminal as a relay node. A wireless backhaul link may be alternatively an access link in some scenarios. For example, the backhaul link 123 may also be considered as an access link for the node 110, and the backhaul link 113 is also an access link of the node 100. It should be understood that the upper-level node may be a base station or a relay node, and the lower-level node may be a relay node, or may be a terminal with a relay function. For example, in a D2D scenario, the lower-level node may be alternatively a terminal.

In FIG. 1, the donor node is a node that may access a core network by using the node, or an anchor base station in a radio access network, and access to the network may be implemented by using the anchor base station. The anchor base station is responsible for data processing at a packet data convergence protocol (PDCP) layer, or is responsible for receiving data from the core network and forwarding the data to a relay node, or receiving data from a relay node and forwarding the data to the core network.

When the relay node is under a half-duplex constraint, spectrum resources of a wireless backhaul link and an access link of an in-band relay overlap, that is, the backhaul link and the access link of the in-band relay have a same frequency band. For example, when performing receiving on a downlink wireless backhaul link of a base station, an rTRP cannot perform transmission to a subordinate terminal or device, and when performing uplink transmission to an upper-level node on a backhaul link, the rTRP cannot receive a transmission on an uplink access link or a backhaul link of a lower-level node by the subordinate terminal or device. It should be understood that the half-duplex constraint of the in-band relay is a half-duplex constraint of simultaneous intra-frequency transmission and reception, and is irrelevant to time division duplex (TDD) or frequency division duplex (FDD) used by the system.

Some common technical terms are defined as follows.

Access link: The access link is a radio link used by a node to communicate with a lower-level node of the node, including a link for uplink transmission and downlink transmission. Uplink transmission on the access link is also referred to as uplink transmission of the access link, and downlink transmission on the access link is also referred to as downlink transmission of the access link. The node includes but is not limited to the above IAB node.

Backhaul link: The backhaul link is a radio link used by a node to communicate with an upper-level node of the node, including a link for uplink transmission and downlink transmission. Uplink transmission on the backhaul link is also referred to as uplink transmission of the backhaul link, and downlink transmission on the backhaul link is also referred to as downlink transmission of the backhaul link. The node includes but is not limited to the above IAB node.

A beam may be understood as a spatial resource, and may be a transmit or receive precoding vector that has energy transmission directivity. In addition, the transmit or receive precoding vector can be identified by using index information. The energy transmission directivity may mean that the precoding vector is used to perform precoding processing on a signal that needs to be sent, so that the signal obtained after precoding processing is performed has specific spatial directivity, and that a received signal obtained after precoding processing is performed by using the precoding vector has relatively good receive power, for example, meets a received demodulation signal-to-noise ratio. The energy transmission directivity may also mean that same signals sent from different spatial locations and received by using the precoding vector have different receive power. Optionally, a same communications device such as a terminal device or a network device may have different precoding vectors, and different communications devices may also have different precoding vectors, that is, correspond to different beams.

For a configuration or a capability of a communications device, one communications device may use one or more of a plurality of different precoding vectors at a same moment, that is, may form one or more beams at the same time. Beam information may be identified by using index information. Optionally, the index information may correspond to a configured resource identifier (ID) of the terminal device. For example, the index information may correspond to an ID or an index (index) or a resource of a configured channel state information-reference signal (CSI-RS), or may correspond to an ID or a resource of a configured uplink sounding reference signal (SRS). Alternatively, optionally, the index information may be index information explicitly or implicitly carried by a signal or a channel carried on a beam. For example, the index information may include but is not limited to index information that is of a beam and that is indicated by a synchronization signal or a broadcast channel sent by using the beam. The resource may be at least one of the following: time domain, frequency domain, or code domain (sequence).

It should be understood that the term "and/or" in this specification describes only an association relationship for describing associated objects and represents that three relationships may exist. For example, A and/or B may represent the following three cases: Only A exists, both A and B exist, and only B exists.

Figure 2:
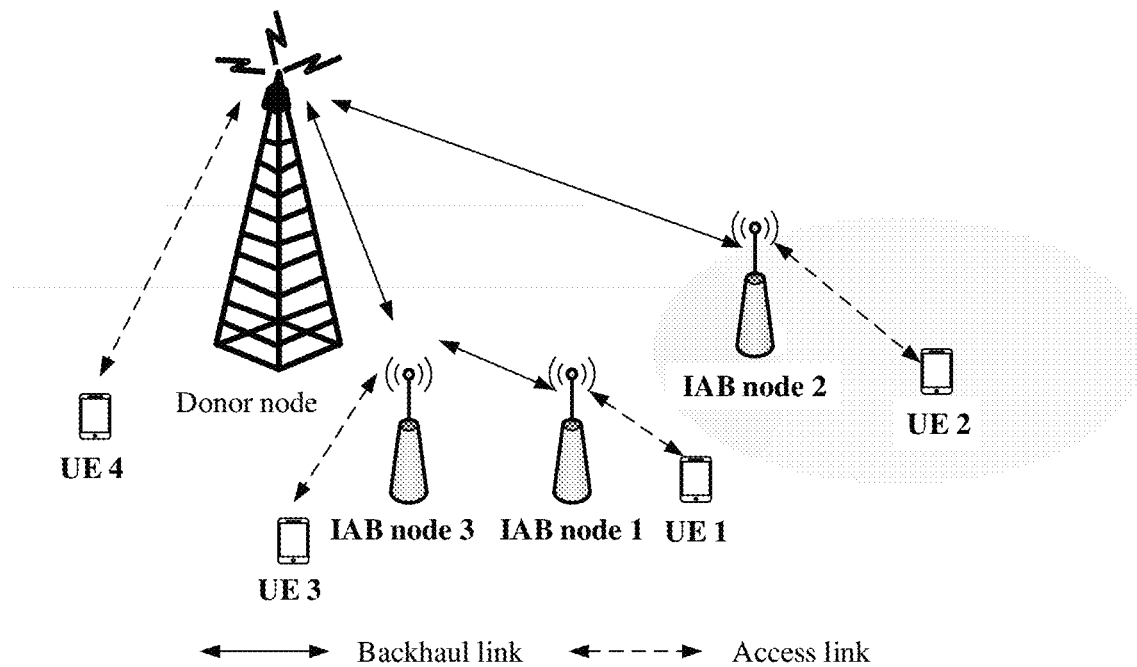
FIG. 2 is a diagram of another system architecture according to an embodiment of this application.

In addition, 5G NR supports a high frequency band and uses a massive antenna technology (Massive MIMO), so that energy of a signal can be transmitted in a specified direction in a centralized manner. In this way, an IAB device can simultaneously receive signals transmitted in a plurality of directions. As shown in FIG. 2, the following further describes some schematic diagrams of system composition in space division transmission in IAB.

As shown in FIG. 2, an IAB system includes IAB devices, for example, an IAB node 1, an IAB node 2, and an IAB node 3, and a terminal device UE and a donor node served by each IAB device. The donor node is an upper-level node or a parent node of the LAB node 2, and the IAB node 2 may perform signal transmission with the donor node and serves UE2. Similarly, an upper-level node of the IAB node 1 is the IAB node 3, and the IAB node 1 performs signal transmission with the IAB node 3 and serves UE1.

Figure 3:
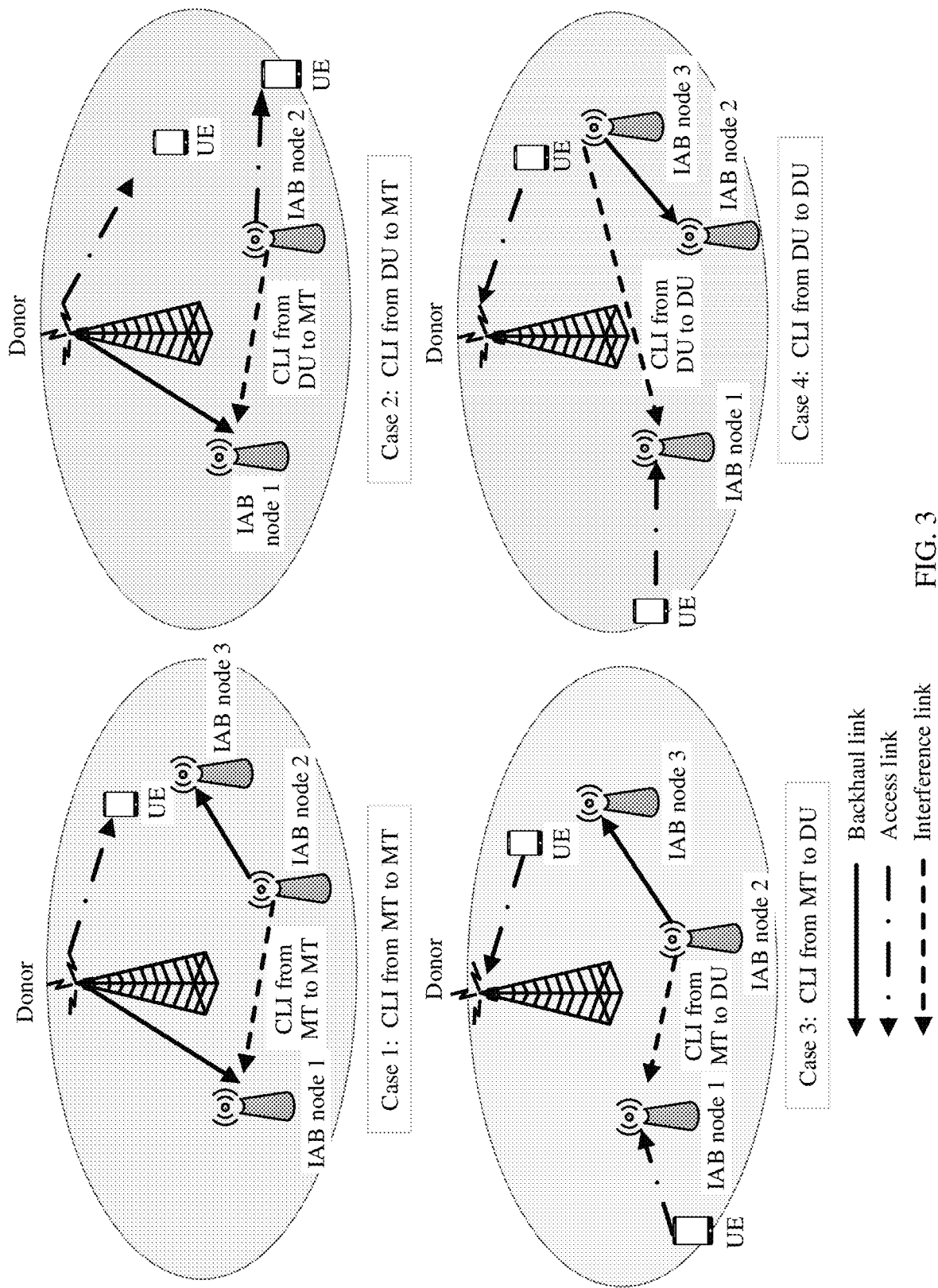
FIG. 3 is a diagram of another system architecture according to an embodiment of this application.

Based on the scenario in FIG. 2, the following specifically describes interference measurement in various application scenarios by using FIG. 3.

In FIG. 3, in a scenario 1, namely, a case 1, the IAB node 1 receives, by using an MT, a signal sent by the donor node, and the IAB node 2 sends data to the IAB node 3 by using an MT. In this case, when receiving a downlink signal, the MT of the IAB node 1 is interfered by an uplink signal sent by the MT of the IAB node 2. Herein, an interference source is the IAB node 2, and an interfered node is the IAB node 1. Cross link interference CLI is interference from the MT of the IAB node 2 to the MT of the IAB node 1.

In FIG. 3, in a scenario 2, namely, a case 2, the IAB node 1 receives, by using an MT, a signal sent by the donor node, and the IAB node 2 sends a signal to the UE by using a DU. In this case, when receiving a downlink signal, the MT of the IAB node 1 is interfered by a downlink signal sent by the DU of the LAB node 2. Herein, an interference source is the DU of the IAB node 2, and an interfered node is the MT of the IAB node 1. Cross link interference is interference from the DU of the IAB node 2 to the MT of the IAB node 1.

In FIG. 3, in a scenario 3, namely, a case 3, the IAB node 1 receives, by using a DU, a signal sent by the UE, and the LAB node 2 sends a signal to the IAB node 3 by using an MT. In this case, when receiving an uplink signal, the DU of the LAB node 1 is interfered by an uplink signal sent by the MT of the IAB node 2. Herein, an interference source is the MT of the LAB node 2, and an interfered node is the DU of the IAB node 1. Cross link interference is interference from the MT of the IAB node 2 to the DU of the LAB node 1.

In FIG. 3, in a scenario 4, namely, a case 4, the IAB node 1 receives, by using a DU, a signal sent by the UE, and the LAB node 3 sends a signal of the LAB node 2 by using a DU. In this case, when receiving an uplink signal, the DU of the IAB node 1 is interfered by a downlink signal sent by the DU of the IAB node 3. Herein, an interference source is the DU of the IAB node 3, and an interfered node is the DU of the IAB node 1. Cross link interference CLI is interference from the DU of the IAB node 3 to the DU of the IAB node 1.

Embodiment 1

Figure 4A:
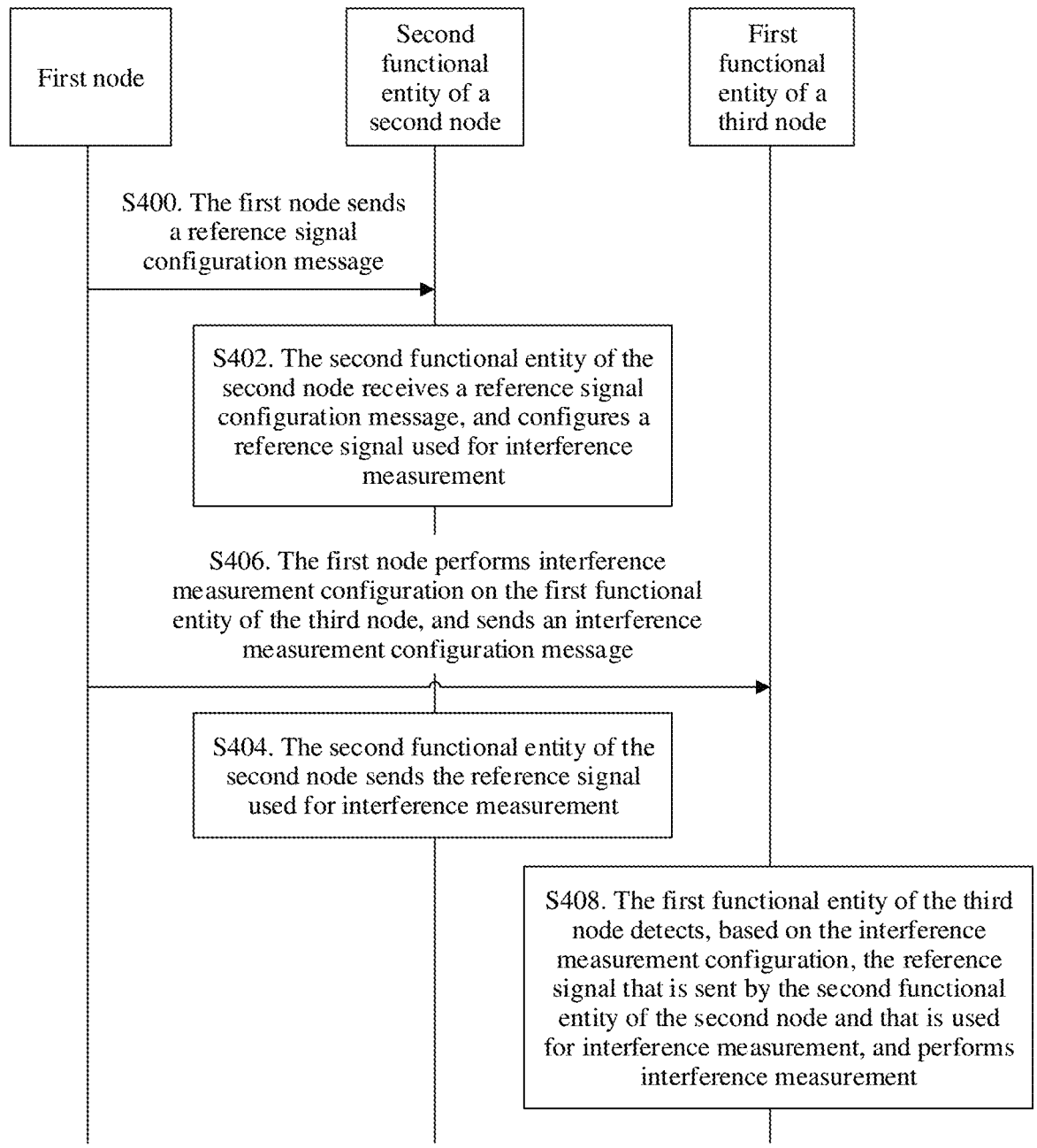
FIG. 4a is a schematic flowchart of interference measurement according to an embodiment of this application.

FIG. 4a is a flowchart of an interference measurement method according to an embodiment of this application. The following describes the interference measurement method in detail by using an IAB network architecture shown in FIG. 5 as an example. The foregoing application scenarios may be applied to the following interference measurement method.

Figure 5:
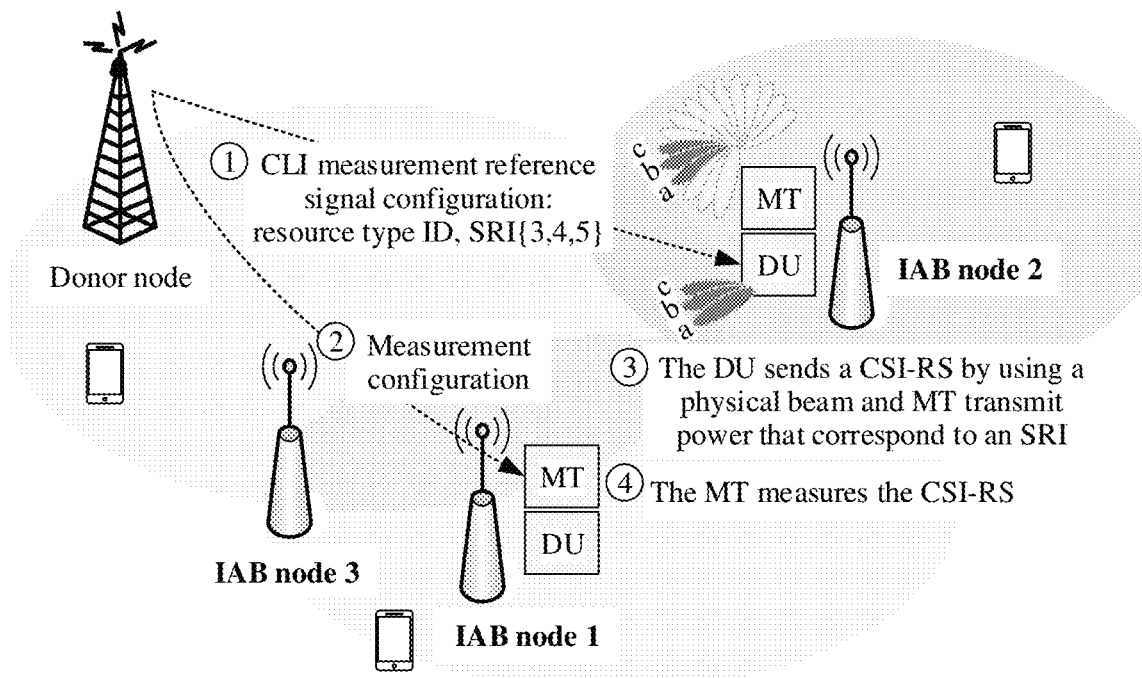
FIG. 5 is a diagram of a system architecture according to an embodiment of this application.

In FIG. 5, an IAB node 1 receives, by using an MT, a signal sent by a DU of an IAB node 3, and an IAB node 2 sends data to a donor node by using an MT. In this case, when receiving a downlink signal, the MT of the IAB node 1 is interfered by an uplink signal sent by the MT of the IAB node 2. Herein, an interference source is the IAB node 2, and an interfered node is the IAB node 1. The interference may be specifically cross link interference CLI, and the CLI is interference from the MT of the IAB node 2 to the MT of the IAB node 1.

As shown in FIG. 5, cross link interference between the MT of the IAB node 1 and the MT of the LAB node 2 may exist in some slots. Therefore, the cross link interference between the MT of the LAB node 1 and the MT of the LAB node 2 needs to be measured. A specific interference measurement method is as follows.

S400. A first node sends a reference signal (RS) configuration message, where the RS configuration message includes reference signal resource indication information of a second functional entity of a second node, and the reference signal resource indication information of the second functional entity includes a reference signal resource identifier of a first functional entity of the second node. The RS configuration message is used to configure a reference signal sent by the second functional entity of the second node, the reference signal sent by the second functional entity of the second node is used to measure interference, and the interference is interference from the first functional entity of the second node to a first functional entity of a third node.

The second node is an interference-generating node, and the third node is an interfered node. The reference signal resource identifier of the first functional entity of the second node is used to indicate a reference signal resource.

In an IAB network shown in FIG. 5, the first node is the donor node, the second node is an interference-generating node such as the IAB node 2, and the third node is an interfered node such as the IAB node 1. The second node and the third node each may include a first functional entity and a second function entity. The first functional entity is an MT, and the second functional entity is a DU. Herein, the first functional entity and the second functional entity may be integrated into one module, or may be independent and separated into different modules. The first functional entity is an MT or a DU, and the second functional entity is a DU or an MT. The first node may be alternatively an IAB node.

Based on a configuration or a capability of the IAB node 2 or the IAB node 1, the LAB node 2 may transmit a signal by using one or more beams at a same moment, and the LAB node 1 may also transmit a signal by using one or more beams at a same moment. The beam may be indicated by a reference signal resource identifier. The reference signal resource identifier of the first functional entity of the second node is a reference signal resource identifier of the MT of the LAB node 2, and is used to indicate one or more reference signal resources used by the MT of the IAB node 2 to send a reference signal. The one or more reference signal resources correspond to one or more transmit beams of the MT. Optionally, the reference signal resource identifier of the first functional entity of the second node may be a configured resource identifier (ID) of a reference signal of an IAB node, for example, a resource identifier (CSI-RS-ResourceId) of a channel state information-reference signal (CSI-RS) or a resource identifier (SRS-ResourceId) of a sounding reference signal (SRS).

The reference signal configuration message may be carried in a radio resource control (RRC) protocol message, or carried in an F1-AP (F1-application protocol) protocol-based message through an F1 interface, for example, a downlink radio resource control transfer message (DL RRC TRANSFER message), where the F1 interface is an F1 interface between a distributed unit (DU) of the IAB node 2 and a centralized unit (CU) of the donor node, or carried in a DCI (Downlink Control Information) message or a MAC CE (Media Access Control control element).

The reference signal configuration message may be alternatively sent by the donor node to the MT of the IAB node 2 by using RRC, DCI, or a MAC CE, and then the MT of the IAB node 2 notifies the DU of the IAB node 2 through internal signaling interaction.

The reference signal configuration message may be periodically sent or may be semi-statically sent.

The reference signal configuration message includes one or more pieces of reference signal resource indication information, and each piece of reference signal resource indication information includes a reference signal resource identifier.

Specifically, a format of the reference signal resource indication information is as follows:
1. Manner 1: A new type of reference signal resource indication information is defined, and an example of a specific format of the indication information is as follows:

```
RS-Resource ::=         SEQUENCE {
                        RS-ResourceId
                        resourceMapping
                        powercontrol
                        periodicityAndOffset......
}
```

RS-Resource is the reference signal resource indication information.

RS-ResourceId is a reference signal resource identifier, and it may be understood that the reference signal resource identifier indicates the DU of the IAB node 2 to send the reference signal by using a beam that is of the MT of the IAB node 2 and that is corresponding to the identifier.

Optionally, the reference signal resource indication information may further include one or more of the following: resourceMapping: indicating a time-frequency resource location to which the reference signal used for interference measurement is mapped; powercontrol: power control of the reference signal, where the power control of the reference signal indicates transmit power used by the DU of the IAB node 2 to send the reference signal, and the transmit power of the reference signal is configured as transmit power of the MT of the IAB node 2; and periodicityAndOffset: indicating a transmission periodicity of the reference signal used for interference measurement and/or a slot offset in each periodicity.
2. Manner 2: The reference signal resource indication information uses a unified format, for example, an existing CSI-RS-Resource message format, and a CSI-RS-Resource message is extended.

Details are as Follows:
CSI-RS resource indication information CSI-RS-Resource is shown as follows:

```
CSI-RS-Resource ::=     SEQUENCE
                        CSI-RS-ResourceId
                        SRS-ResourceId
                        resourceMapping
                        powerControl
                        periodicityAndOffset...
}
```

CSI-RS-Resource is the reference signal resource indication information.

CSI-RS-ResourceId is a common reference signal resource identifier used for CSI measurement, and is used to indicate the DU of the IAB node 2 to send, by using a beam configured by the DU, a reference signal used for CSI measurement.

SRS-ResourceId is a reference signal resource identifier, and the reference signal resource identifier is used to indicate the DU of the IAB node 2 to send the reference signal by using a beam that is of the MT of the IAB node 2 and that is corresponding to the identifier.

resourceMapping is used to indicate a time-frequency resource location to which the reference signal is mapped.

powercontrol is power control of the reference signal and indicates transmit power used by the DU of the IAB node 2 to send the reference signal.

periodicityAndOffset indicates a transmission periodicity of the reference signal used for interference measurement and/or a slot offset in each periodicity.

When the donor node sends the reference signal configuration message to the DU of the IAB node 2, if the DU of the LAB node 2 identifies SRS-ResourceId included in the reference signal configuration message, it may be learned that a current reference signal configuration is used for interference measurement, and is specifically used for cross link interference measurement.

The powerControl field indicates power used for sending the reference signal. If a reference signal resource used for channel state information CSI measurement is currently indicated, the field is set as transmit power information of a CSI-RS. When a reference signal resource used for cross link interference CLI measurement is indicated, the field is set as transmit power information of an SRS.

Specifically, taking FIG. 5 as an example, step S400 may be understood as follows:

When the MT of the LAB node 1 is interfered by the MT of the LAB node 2, the donor node generates an RS configuration message. The RS configuration message is used to configure a reference signal that is sent by the DU of the IAB node 2 and that is used for interference measurement. The reference signal used for interference measurement is used by the MT of the IAB node 1 to measure interference from the MT of the IAB node 2, and the RS configuration message includes reference signal resource identifiers such as {3, 4, 5} of the DU of the IAB node 2, and the reference signal resource identifiers correspond to beams of the MT of the IAB node 2.

S402. The second functional entity of the second node configures, based on the received RS configuration message, a reference signal used for interference measurement.

As shown in FIG. 5, the DU of the IAB node 2 selects a corresponding beam based on the reference signal resource identifier to send the reference signal.

A correspondence between a reference signal resource identifier and a beam specifically used for transmitting a signal is known for the MT of the IAB node 2. However, in the IAB node 2, the DU may interact with the MT, so that the DU can also identify the beams of the MT that are corresponding to the SRIs {3, 4, 5}, for example, three physical beams identified by shadows in FIG. 5.

For example, the MT of the IAB node 2 transmits a signal by using a beam set {a, b, c} corresponding to the reference signal resource identifiers {3, 4, 5}. When the MT of the IAB node 1 performs interference measurement on the MT of the LAB node 2, the DU of the IAB node 2 interacts with the MT of the LAB node 2 to obtain the beam set {a, b, c} that is of the MT of the IAB node 2 and that is corresponding to the reference signal resource identifiers {3, 4, 5}, and the DU of the LAB node 2 sends, by using the beam set {a, b, c}, the reference signal used for interference measurement.

It should be noted that interaction between the MT and the DU that are of the IAB node 2 may be interaction between hardware modules, or may be implemented by using software when the MT and the DU are integrated. Further, the reference signal resource indication information in the configuration message further includes one or a combination of the following: the time-frequency resource to which the reference signal of the DU of the IAB node 2 is mapped, the transmit power of the reference signal of the DU of the IAB node 2, or the transmission periodicity of the reference signal of the DU of the IAB node 2.

Because the DU of the IAB node 2 needs to configure, based on configuration information of the MT of the IAB node 2, the reference signal used for interference measurement, and the reference signal is sent by the DU of the IAB node 2 instead of the MT of the IAB node 2, so that the IAB node 1 can accurately detect the reference signal used for interference measurement, to measure interference and eliminate the interference, thereby greatly improving performance of the IAB network.

S404. The second functional entity of the second node sends the reference signal used for interference measurement.

As shown in FIG. 5, the DU of the LAB node 2 sends, by using one or more beams corresponding to the reference signal resource identifier in the RS configuration message, the reference signal used for interference measurement, so that the MT of the LAB node 1 performs interference measurement.

Further, the DU of the IAB node 2 may further send, on a specified time-frequency resource, the reference signal used for interference measurement. If periodic measurement needs to be performed, the DU of the IAB node 2 further periodically sends the reference signal in a specified transmission periodicity, and sends the reference signal by using specified transmit power.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

S406. The first node performs interference measurement configuration on the first functional entity of the third node, and sends an interference measurement configuration message.

In addition to being performed after step S404, step S406 may be performed before step S404 of sending the reference signal used for interference measurement.

As shown in FIG. 5, an interference measurement configuration message sent by the donor node to the MT of the IAB node 1 may be sent by the donor node to the MT of the LAB node 1 based on an RRC (Radio Resource Control, radio resource control) protocol, and may be carried in a specific message of the RRC protocol, or may be indicated by using a MAC CE.

As shown in FIG. 5, when performing interference measurement configuration on the MT of the LAB node 1, the donor node performs interference measurement configuration on the MT by using a conventional measurement configuration method. That is, the IAB node 1 does not perceive that the measurement configuration is used for interference measurement. For example, the donor node may perform configuration based on a conventional configuration used for mobility measurement. The interference measurement configuration message sent to the MT of the IAB node 1 includes specific reference signal resource indication information, for example, a time-frequency resource location and a periodicity of a reference signal, and further includes a reference signal resource identifier. A quantity of reference signal resource identifiers herein, namely, a quantity of reference signal resources that need to be measured, is consistent with a quantity of reference signal resources sent by the donor node to the DU of the IAB node 2.

S408. The first functional entity of the third node detects, based on the measurement configuration in step S406, the reference signal that is sent by the second functional entity of the second node and that is used for interference measurement, and performs interference measurement.

As shown in FIG. 5, after receiving the measurement configuration, the MT of the IAB node 1 detects, at the indicated resource location, the reference signal that is sent by the DU of the LAB node 2 and that is used for interference measurement.

Figure 4B:
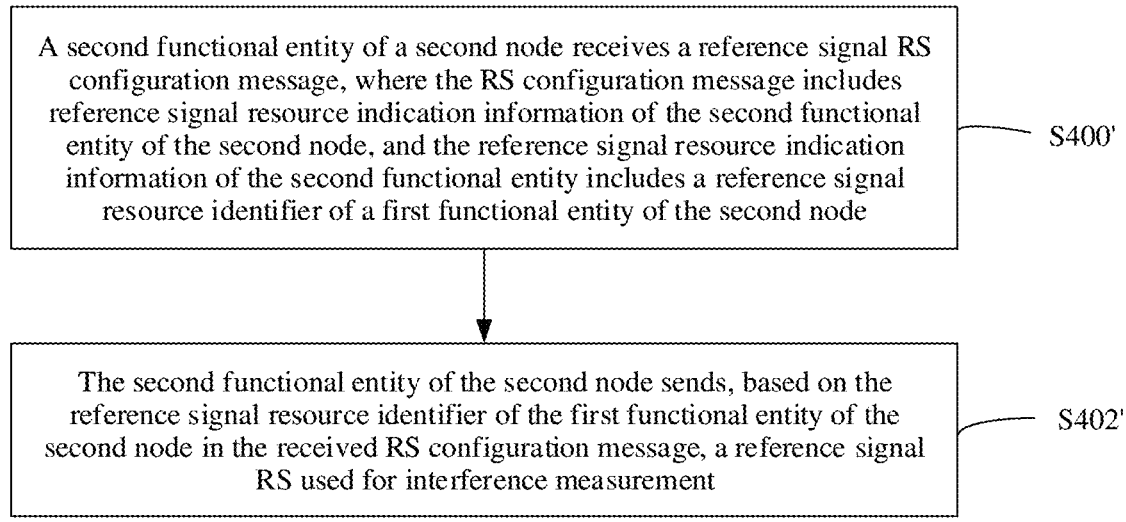
FIG. 4b is another schematic flowchart of interference measurement according to an embodiment of this application.

For the foregoing Embodiment 1, this embodiment of the present disclosure further provides another embodiment. As shown in FIG. 4b, the foregoing process is briefly described by using the second node.

An interference measurement method is provided, and is applied to an integrated access and backhaul IAB network. The IAB network includes at least a first node and a second node, and the second node includes a first functional entity and a second function entity. The method includes the following steps:

S400'. The second functional entity of the second node receives a reference signal configuration message, where the reference signal configuration message includes reference signal resource indication information of the second functional entity of the second node, and the reference signal resource indication information of the second functional entity includes a reference signal resource identifier of the first functional entity of the second node.

Further, the reference signal resource indication information further includes one or any combination of the following: a time-frequency resource location to which an RS used for interference measurement is mapped, power control of the RS used for interference measurement, and a transmission periodicity of the RS used for interference measurement.

S402'. The second functional entity of the second node sends, based on the reference signal resource identifier of the first functional entity of the second node in the received reference signal configuration message, an RS used for interference measurement.

Specifically, the second functional entity of the second node determines, based on the reference signal resource identifier of the first functional entity of the second node in the received reference signal configuration message, one or more beams corresponding to the reference signal resource identifier of the first functional entity of the second node; and the second functional entity of the second node sends, by using the determined one or more beams, the RS used for interference measurement.

Further, the power control of the RS used for interference measurement is transmit power of the first functional entity of the second node.

Further, before step S400', the method further includes the following.

The first node generates the reference signal configuration message.

The foregoing method procedure is also applicable to the descriptions of the embodiments corresponding to FIG. 4a, FIG. 4b, and FIG. 5. For details, refer to the specific descriptions of the corresponding embodiments. Details are not described herein again.

This application provides an interference measurement method and apparatus. A second functional entity of an interference-generating node sends, by using one or more beams corresponding to a reference signal resource identifier of a first functional entity of the interference-generating node, an RS used for interference measurement, so that an interfered node can quickly and accurately perform interference measurement, thereby greatly reducing impact of cross-link signal transmission and improving transmission performance of a system.

Embodiment 2

Figure 6:
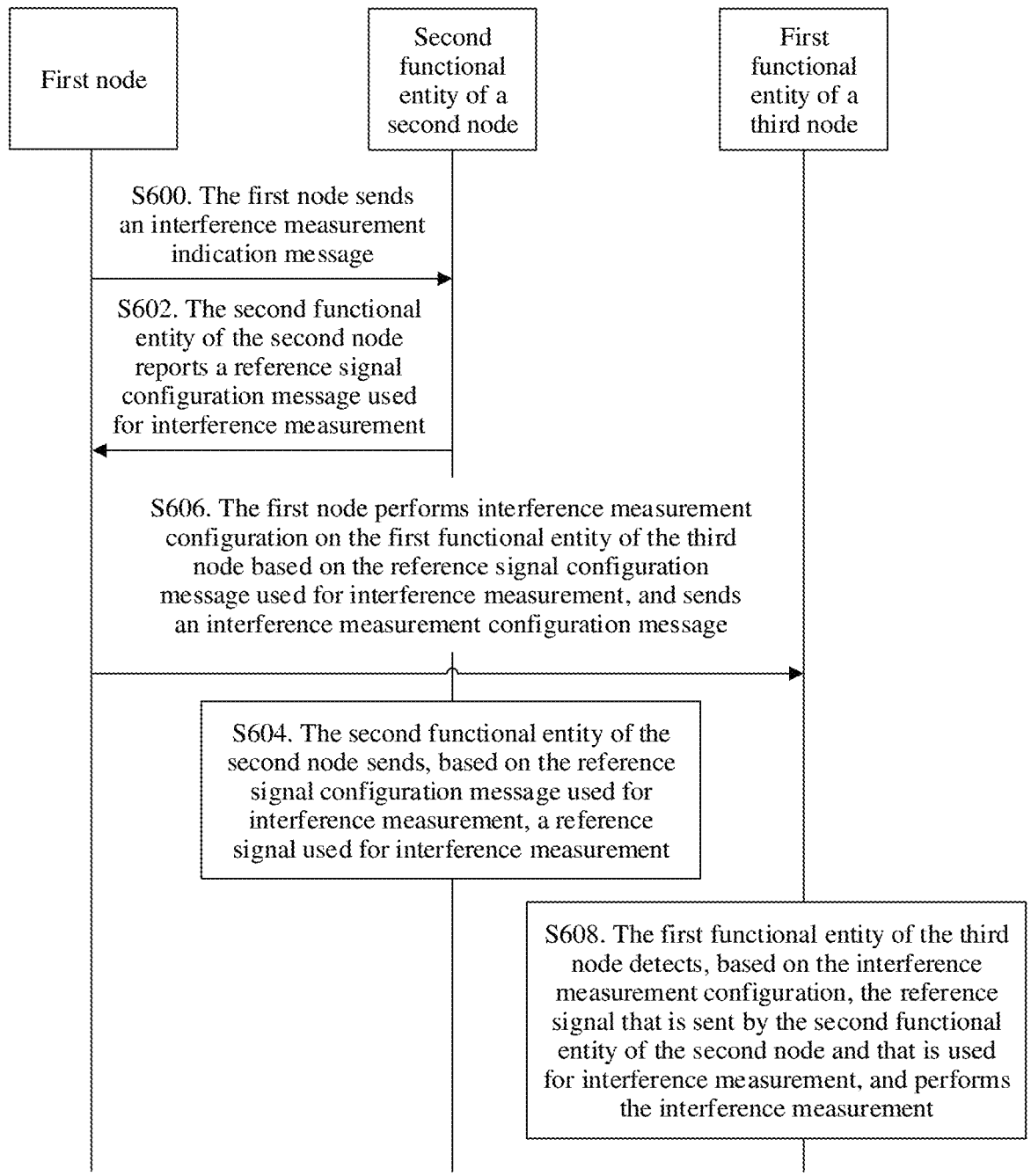
FIG. 6 is another schematic flowchart of interference measurement according to an embodiment of this application.

As shown in FIG. 6, this embodiment of the present disclosure further provides another embodiment.

Figure 7:
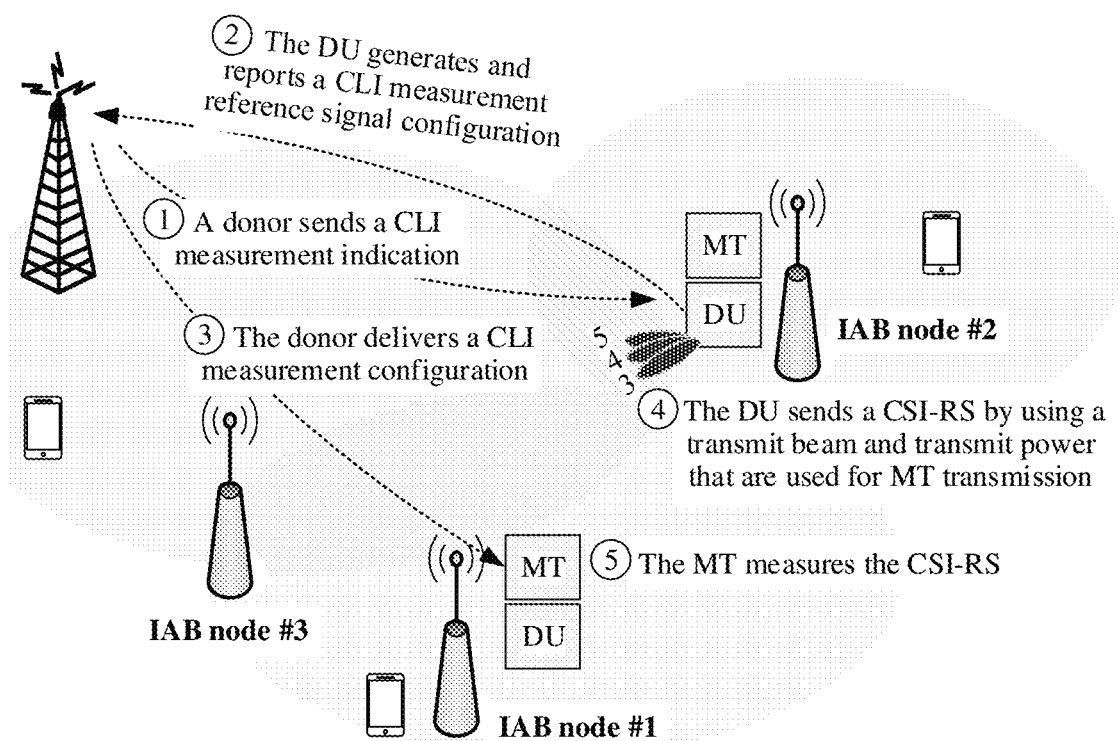
FIG. 7 is a diagram of a system architecture according to an embodiment of this application.

A networking architecture diagram of IAB in FIG. 7 is used as an example for description. However, this embodiment of the present application is not limited to FIG. 7, and may be applied to the foregoing various networking architecture diagrams.

In FIG. 7, an IAB node 1 receives, by using an MT, a signal sent by a DU of an IAB node 3, and an IAB node 2 sends data to a donor node by using an MT. In this case, when receiving a downlink signal, the MT of the IAB node 1 is interfered by an uplink signal sent by the MT of the IAB node 2. Herein, an interference source is the IAB node 2, and an interfered node is the LAB node 1. The interference may be specifically cross link interference CLI, and the CLI is interference from the MT of the IAB node 2 to the MT of the LAB node 1.

As shown in FIG. 7, cross link interference between the MT of the LAB node 1 and the MT of the LAB node 2 may exist in some slots. Therefore, the cross link interference between the MT of the LAB node 1 and the MT of the LAB node 2 needs to be measured. A specific interference measurement method is as follows:

In an IAB network shown in FIG. 7, a first node is the donor node, a second node is an interference-generating node such as the IAB node 2, and a third node is an interfered node such as the LAB node 1. The second node and the third node each may include a first functional entity and a second function entity. The first functional entity is an MT, and the second functional entity is a DU. Herein, the first functional entity and the second functional entity may be integrated into one module, or may be independent and separated into different modules. The first functional entity is an MT or a DU, and the second functional entity is a DU or an MT. The first node may be alternatively an IAB node.

S600. The first node sends an interference measurement indication message, where the interference measurement indication message is used to indicate the second functional entity of the second node to report a reference signal configuration message used for interference measurement.

As shown in FIG. 7, the donor node sends an interference measurement indication message to a DU of the IAB node 2, to indicate the DU of the IAB node 2 to generate and report reference signal configuration message used for interference measurement.

The interference measurement indication message may be carried in a radio resource control (Radio Resource Control, RRC) protocol message, or carried in an F1-AP (F1-application protocol) protocol-based message through an F1 interface, for example, a downlink radio resource control transfer message (DL RRC TRANSFER message). The F1 interface is an F1 interface between a distributed unit (distributed unit, DU) of the IAB node 2 and a centralized unit (central unit, CU) of the donor node.

The interference measurement indication message may be alternatively sent by the donor node to the MT of the IAB node 2 by using RRC, DCI, or a MAC CE, and then the MT of the IAB node 2 notifies the DU of the IAB node 2 through internal signaling interaction, so that the DU of the IAB node 2 generates and reports the reference signal configuration information used for interference measurement.

Specific implementations of the interference measurement indication message include the following several manners:

Manner 1: One bit is used for indication, and the second functional entity of the second node is triggered to generate and report the reference signal configuration information used for interference measurement, for example, CLI-Meas-Indicator: 0 or 1 is used for indication.

Manner 2: The interference measurement indication message includes one or a combination of the following: a transmission slot or a transmission periodicity of a reference signal that is sent by the second functional entity of the second node and that is used for interference measurement, and the second functional entity of the second node is triggered, by using the foregoing message, to generate and report the reference signal configuration information used for interference measurement. For example, this is implemented by using the following message format of the indication message:

```
CLI-Meas-Indicator ::= SEQUENCE {
sfnForCliMeas OPTIONAL
periodicityAndOffset =
...
``` sfnForCliMeas indicates the transmission slot of the reference signal used for interference measurement, and periodicityAndOffset indicates the transmission periodicity of the reference signal used for interference measurement and/or a slot offset in each periodicity.

Manner 3: Manner 3 is implemented by combining Manner 1 with Manner 2. Specifically, the second functional entity of the second node is triggered by using Manner 1 to generate the reference signal configuration information used for interference measurement, and then the transmission slot or the transmission periodicity of the reference signal that is sent by the second functional entity of the second node and that is used for interference measurement is indicated by using Manner 2.

S602. The second functional entity of the second node reports the reference signal configuration message used for interference measurement, where the reference signal configuration message includes reference signal resource indication information of the second functional entity of the second node, and the reference signal resource indication information of the second functional entity includes a reference signal resource identifier of the second functional entity of the second node.

Specifically, the second functional entity of the second node generates the reference signal resource indication information of the second function entity, where the reference signal resource indication information of the second functional entity includes the reference signal resource identifier of the second functional entity of the second node.

The reference signal resource identifier of the second functional entity of the second node is obtained by the second functional entity of the second node based on a transmit beam of the first functional entity of the second node.

Further, when configuring transmit power of the reference signal, the second functional entity of the second node uses transmit power of the first functional entity of the second node as the transmit power of the reference signal of the second functional entity of the second node, and configures a time-frequency resource used by the reference signal and the transmission periodicity of the reference signal. The second functional entity of the second node adds the transmit power, the time-frequency resource, and the transmission periodicity to the reference signal resource indication information, and reports the reference signal resource indication information to the first node by using the reference signal configuration message used for interference measurement.

As shown in FIG. 7, a specific format of the reference signal resource indication information is as follows.

A new type of reference signal resource indication information is defined, and an example of a specific format of the indication information is as follows:

| RS-Resource ::= | SEQUENCE { RS-ResourceId resourceMapping powercontrol periodicityAndOffset ... } |
|---|---|

RS-Resource is the reference signal resource indication information.

RS-ResourceId is a reference signal resource identifier.

Optionally, the reference signal resource indication information may further include one or more of the following: resourceMapping: indicating a time-frequency resource location to which the reference signal is mapped; powercontrol: power control of the reference signal, where the power control indicates transmit power used by the DU of the IAB node 2 to send the reference signal, and the transmit power of the reference signal is configured as transmit power of the MT of the IAB node 2; and periodicityAndOffset: indicating a transmission periodicity of the reference signal used for interference measurement and/or a slot offset in each periodicity.

When the transmit power and the time-frequency resource described above are configured by the first node, refer to delivering of the reference signal configuration message to the second functional entity of the second node provided in FIG. 4a, FIG. 4b, and FIG. 5. Alternatively, the transmit power and the time-frequency resource may be sent to the second functional entity of the second node by using another message.

Specifically, a process of obtaining the transmit beam of the first functional entity of the second node and the transmit power of the first functional entity of the second node is as follows.

As shown in FIG. 7, the DU of the IAB node 2 obtains a transmit beam and transmit power of the MT of the IAB node 2 by exchanging information with the MT of the IAB node 2, and the DU of the IAB node 2 generates a reference signal resource identifier based on the obtained transmit beam of the MT.

Transmit beam information herein may be a beam or a beam set used by the MT to send an SRS last time, or may be a beam or a beam set corresponding to an SRI that is configured by the donor node and that is received by the MT of the IAB node 2 last time, and each of these beams corresponds to one SRI.

The DU of the LAB node 2 sends, by using the transmit beam and the transmit power of the MT of the LAB node 2, the reference signal used for interference measurement.

The reference signal configuration message that is generated by the DU of the IAB node 2 and that is used for interference measurement includes one or more pieces of reference signal resource indication information, and each piece of reference signal resource indication information corresponds to one transmit beam. For example, if the MT notifies the DU of 16 beams, the DU generates 16 pieces of reference resource indication information, and the 16 pieces of reference resource indication information are included in the reference signal configuration message.

In addition, the reference signal configuration message that is generated by the DU of the LAB node 2 and sent to the donor node and that is used for interference measurement may be carried in a radio resource control (Radio Resource Control, RRC) protocol message, or carried in an F1-AP (F1-application protocol) protocol-based message through an F1 interface. The F1 interface is an F1 interface between a distributed unit (distributed unit, DU) of the IAB node 2 and a centralized unit (central unit, CU) of the donor node.

S604. The second functional entity of the second node sends, based on the reference signal configuration message used for interference measurement, a reference signal used for interference measurement.

As shown in FIG. 7, the DU of the IAB node 2 sends the reference signal on the obtained transmit beam of the MT of the IAB node 2.

Further, the DU of the IAB node 2 sends, on a time-frequency resource configured by the DU or a specified time-frequency resource, the reference signal used for interference measurement. If periodic measurement needs to be performed, the DU of the IAB node 2 further periodically sends the reference signal in a transmission periodicity configured by the DU or a specified transmission periodicity, and sends the reference signal by using specified transmit power or transmit power configured by the DU.

The reference signal may include one or more of the following: a synchronization signal SSB (SS/PBCH block), a channel state information-reference signal CSI-RS, a demodulation reference signal DMRS (Demodulation Reference Signal), a tracking reference signal TRS (Tracking Reference Signal), a phase tracking reference signal PTRS (Phase Tracking Reference Signal), a sounding reference signal SRS, or another reference signal RS.

S606. The first node performs interference measurement configuration on the first functional entity of the third node based on the reference signal configuration message used for interference measurement, and sends an interference measurement configuration message to the first functional entity of the third node.

For a specific measurement configuration process of S606, refer to the descriptions of step S406 corresponding to FIG. 4a, FIG. 4b, and FIG. 5. Details are not described herein again.

S608. The first functional entity of the third node detects, based on the interference measurement configuration, the reference signal that is sent by the second functional entity of the second node and that is used for interference measurement, and performs interference measurement.

As shown in FIG. 7, after receiving the measurement configuration, the MT of the IAB node 1 detects, at the indicated resource location, the reference signal that is sent by the DU of the IAB node 2 and that is used for interference measurement.

This application provides an interference measurement method and apparatus. A second functional entity of an interference-generating node sends, by using one or more beams corresponding to a reference signal resource identifier of a first functional entity of the interference-generating node, a reference signal used for interference measurement, so that an interfered node can quickly and accurately perform interference measurement, thereby greatly reducing impact of cross-link signal transmission and improving transmission performance of a system.

Embodiment 3

Figure 8A:
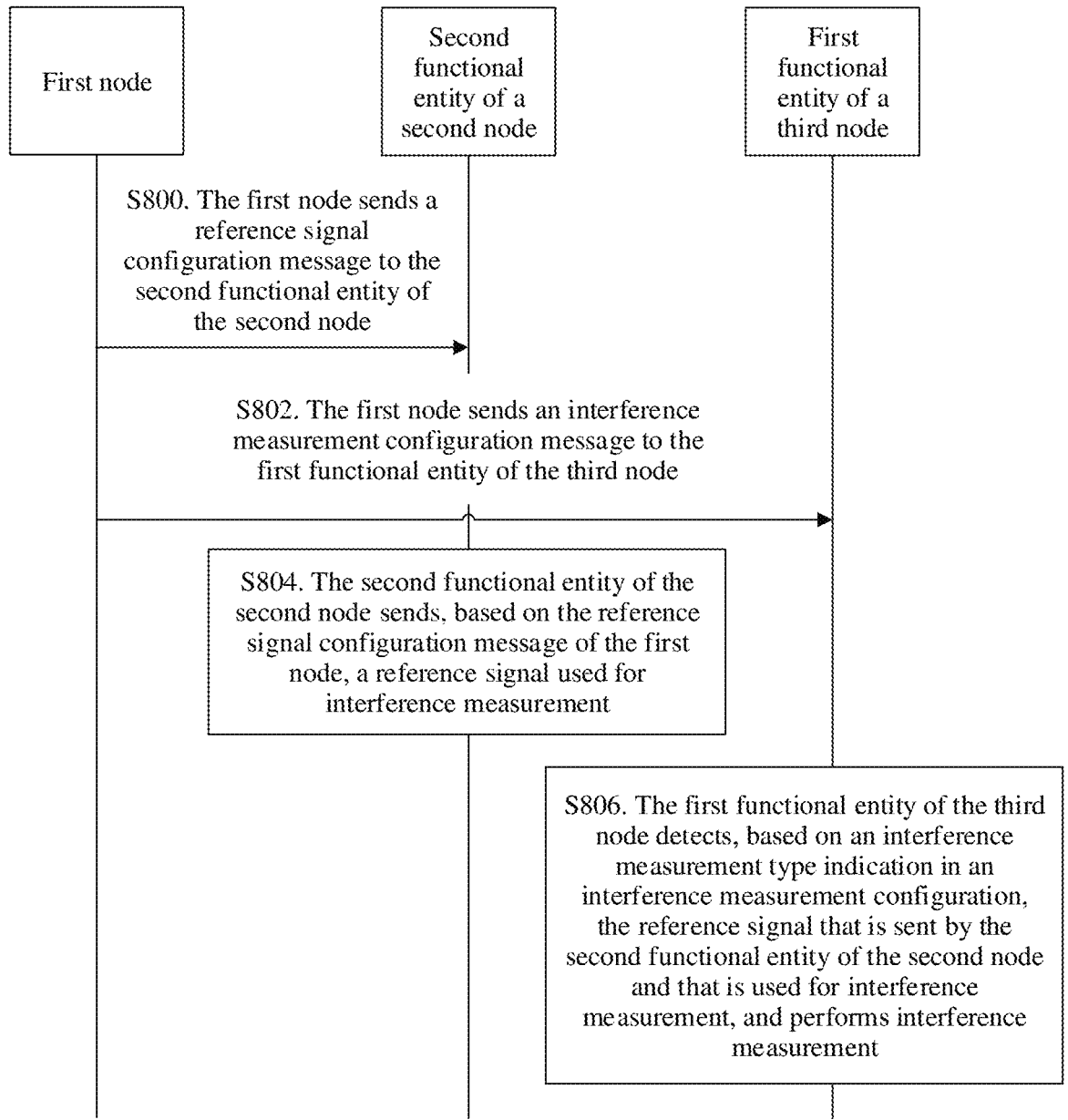
FIG. 8a is a schematic flowchart of interference measurement according to an embodiment of this application.

As shown in FIG. 8a, this embodiment of the present disclosure further provides another embodiment.

Figure 9:
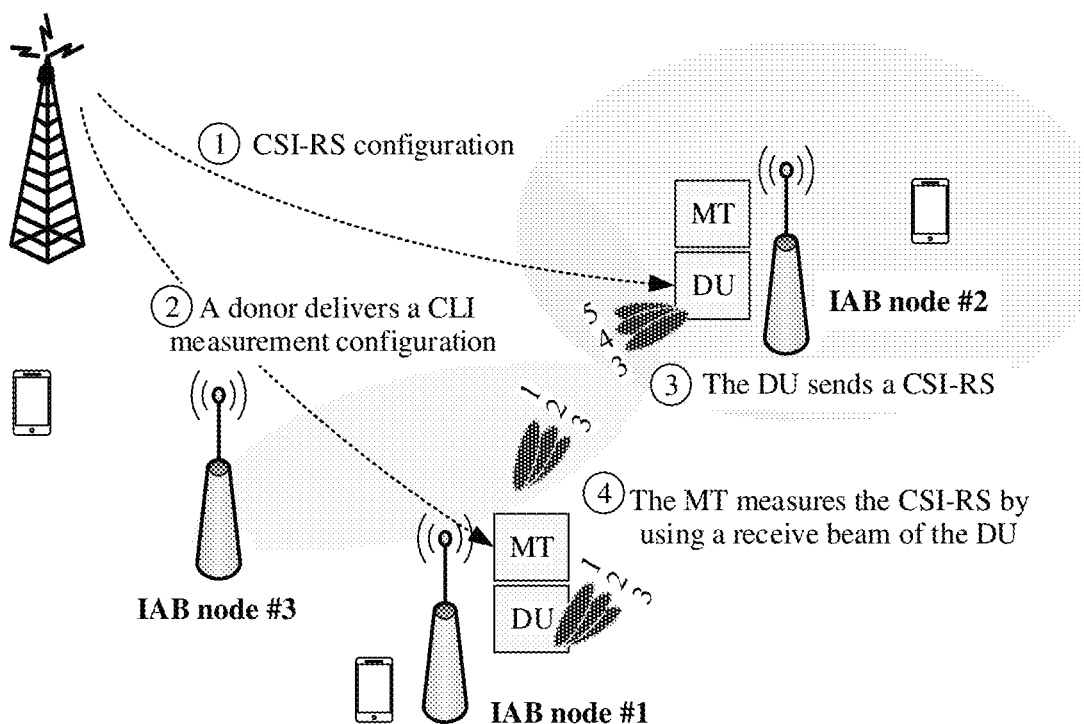
FIG. 9 is a diagram of a system architecture according to an embodiment of this application.

A networking architecture diagram of IAB in FIG. 9 is used as an example for description. However, this embodiment of the present application is not limited to FIG. 9, and may be applied to the foregoing various networking architecture diagrams.

In FIG. 9, an IAB node 1 receives, by a DU, a signal sent by a lower-level IAB node or a terminal device, and an IAB node 2 sends data to the lower-level IAB node or the terminal device by a DU. In this case, when receiving an uplink signal, the DU of the IAB node 1 is interfered by a downlink signal sent by the DU of the IAB node 2. Herein, an interference source is the DU of the LAB node 2, and an interfered node is the DU of the IAB node 1. The interference may be cross link interference CLI, and the CLI is interference from the DU of the IAB node 2 to the DU of the IAB node 1.

As shown in FIG. 9, cross link interference between the DU of the IAB node 1 and the DU of the IAB node 2 may exist in some slots. Therefore, the cross link interference between the DU of the LAB node 1 and the DU of the IAB node 2 needs to be measured. A specific interference measurement method is as follows.

S800. A first node sends an RS configuration message to a second functional entity of a second node, where the RS configuration message includes reference signal resource indication information of the second functional entity of the second node, and the reference signal resource indication information of the second functional entity of the second node includes one or a combination of the following: a reference signal resource identifier of the second function entity, transmit power of a reference signal of the second function entity, a time-frequency resource to which the reference signal of the second functional entity is mapped, and a sending period of the reference signal of the second function entity.

The reference signal resource indication information uses a unified format, for example, an existing CSI-RS-resource information format.

Details are as follows.

CSI-RS resource indication information CSI-RS-Resource is shown as follows:

| | |
|---|---|
| CSI-RS-Resource ::= | SEQUENCE |
| | CSI-RS-ResourceId |
| | resourceMapping |
| | powerControl |
| | periodicityAndOffset |
| ... | |
| } | |

CSI-RS Resource is the reference signal resource indication information.

CSI-RS-ResourceId is a common reference signal resource identifier used for CSI measurement, and is used to indicate the DU of the IAB node 2 to send, by using a beam configured by the DU, a reference signal used for CSI measurement.

resourceMapping indicates a time-frequency resource location to which the reference signal is mapped.

powercontrol is power control of the reference signal, and the power control of the reference signal indicates transmit power used by the DU of the IAB node 2 to send the reference signal.

periodicityAndOffset indicates a transmission periodicity of the reference signal used for interference measurement and/or a slot offset in each periodicity.

The RS configuration message may be carried in a radio resource control (Radio Resource Control, RRC) protocol message, or carried in an F1-AP (F1-application protocol) protocol-based message through an F1 interface, for example, a downlink radio resource control transfer message (DL RRC TRANSFER message). The F1 interface is an F1 interface between a distributed unit (DU) of the IAB node 2 and a centralized unit (central unit, CU) of a donor node.

The reference signal configuration message may be periodically sent or may be semi-statically sent.

S802. The first node sends an interference measurement configuration message to a first functional entity of a third node, where the interference measurement configuration message includes the reference signal resource indication information of the second functional entity of the second node and/or interference measurement type indication information, and the interference measurement type indication information is used to indicate the first functional entity of the third node to perform interference measurement by using a receive beam of a second functional entity of the third node.

For a format and content of the reference signal resource indication information of the second functional entity of the second node, refer to the specific descriptions of step S800. The interference measurement type indication information such as DUtoDU-Meas-Type may be added to a reserved field in the foregoing format of the reference signal resource indication information by extending the format of the reference signal resource indication information of the second functional entity of the second node in S800, or the interference measurement type indication information such as DUtoDU-Meas-Type may be placed in a reserved field of the RS configuration message.

The interference measurement configuration message sent by the first node to the first functional entity of the third node may be sent by the first node to the first functional entity of the third node based on an RRC (Radio Resource Control, radio resource control) protocol, and may be carried in a specific message of the RRC protocol, or may be indicated by using a MAC CE.

As shown in FIG. 9, the foregoing descriptions may be understood as follows: A configuration used for interference measurement sent by the donor node to the MT of the IAB node 1 may be sent by the donor node to the MT of the IAB node 1 based on an RRC (Radio Resource Control, radio resource control) protocol, and may be carried in a specific message of the RRC protocol, or may be indicated by using a MAC CE.

S804. The second functional entity of the second node sends, based on the reference signal configuration message of the first node, a reference signal used for interference measurement.

As shown in FIG. 9, the DU of the IAB node 2 sends the reference signal by using a transmit beam of the DU.

Further, the DU of the IAB node 2 sends, on a specified time-frequency resource, the reference signal used for interference measurement. If periodic measurement needs to be performed, the DU of the IAB node 2 further periodically sends the reference signal in a specified sending periodicity, and sends the reference signal by using specified transmit power.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

S806. The first functional entity of the third node detects, according to the interference measurement type indication in the interference measurement configuration, the reference signal that is sent by the second functional entity of the second node and that is used for interference measurement, and performs interference measurement.

As shown in FIG. 7, the MT of the LAB node 1 detects, by using a receive beam of the DU of the IAB node 1 according to the interference measurement type indication, the reference signal sent by the DU of the IAB node 2, and performs interference measurement.

Further, the MT of the IAB node 1 may further detect, based on a time-frequency resource and a periodicity indicated in an interference configuration, the reference signal that is sent by the DU of the IAB node 2 and that is used for interference measurement.

Figure 8B:
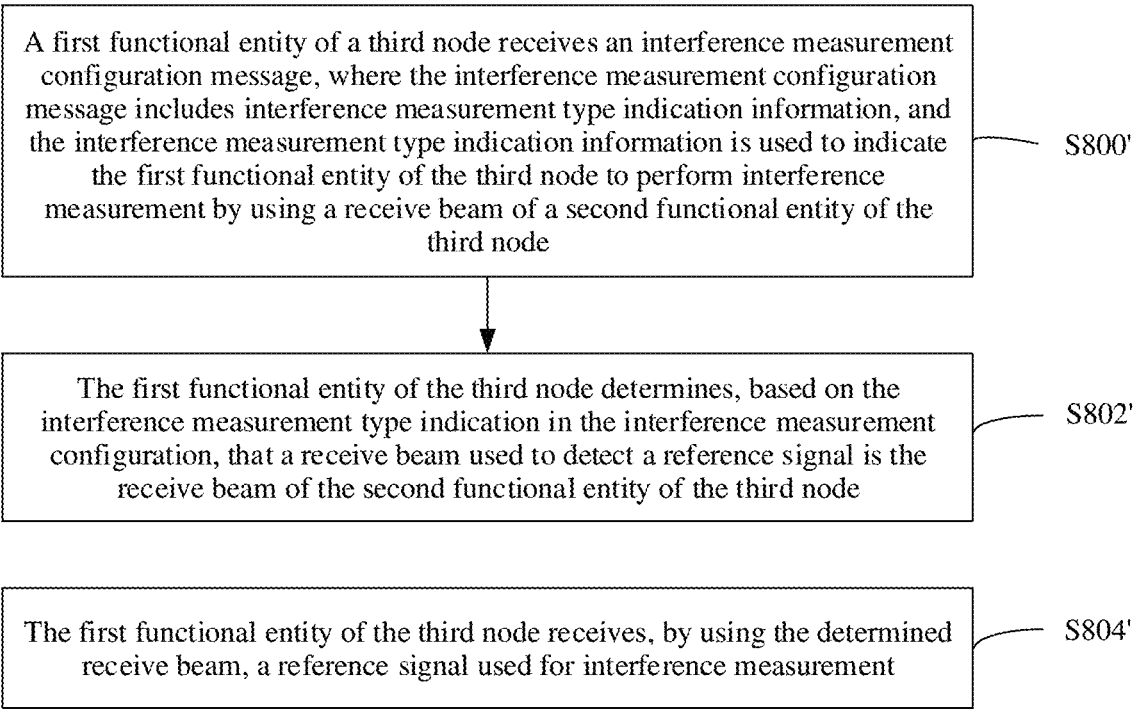
FIG. 8b is another schematic flowchart of interference measurement according to an embodiment of this application.

Based on the foregoing Embodiment 3, this embodiment of the present disclosure further provides another embodiment. As shown in FIG. 8b, the foregoing process is briefly described by using the third node.

An interference measurement method is provided, and is applied to an integrated access and backhaul IAB network. The IAB network includes at least a first node, a second node, and a third node, and the second node and the third node each include a first functional entity and a second function entity. The method includes the following steps:

S800'. The first functional entity of the third node receives an interference measurement configuration message, where the interference measurement configuration message includes interference measurement type indication information, and the interference measurement type indication information is used to indicate the first functional entity of the third node to perform interference measurement by using a receive beam of the second functional entity of the third node. S802'. The first functional entity of the third node determines, according to the interference measurement type indication in the interference measurement configuration, that a receive beam used for detecting a reference signal is the receive beam of the second functional entity of the third node.

S804'. The first functional entity of the third node receives, by using the determined receive beam, a reference signal used for interference measurement.

Further, the interference measurement configuration message further includes reference signal resource indication information of the second functional entity of the second node, and the reference signal resource indication information of the second functional entity of the second node includes one or a combination of the following: a reference signal resource identifier of the second functional entity of the second node, transmit power of the RS that is of the second functional entity of the second node and that is used for interference measurement, a time-frequency resource location to which the RS that is of the second functional entity of the second node and that is used for interference measurement is mapped, or a sending periodicity of the RS that is of the second functional entity of the second node and that is used for interference measurement.

Before step S800', the method further includes the following.

The first node generates the interference measurement configuration message.

The foregoing method further includes the following.

The first node sends an RS configuration message to the second functional entity of the second node, where the RS configuration message includes the reference signal resource indication information of the second functional entity of the second node.

The foregoing method procedure is also applicable to the descriptions of the embodiments corresponding to FIG. 6 and FIG. 7. For details, refer to the specific descriptions of the corresponding embodiments. Details are not described herein again.

This application provides an interference measurement method, so that an interfered node can quickly and accurately perform interference measurement, thereby greatly reducing impact of cross-link signal transmission and improving transmission performance of a system.

Embodiment 4

Figure 10:
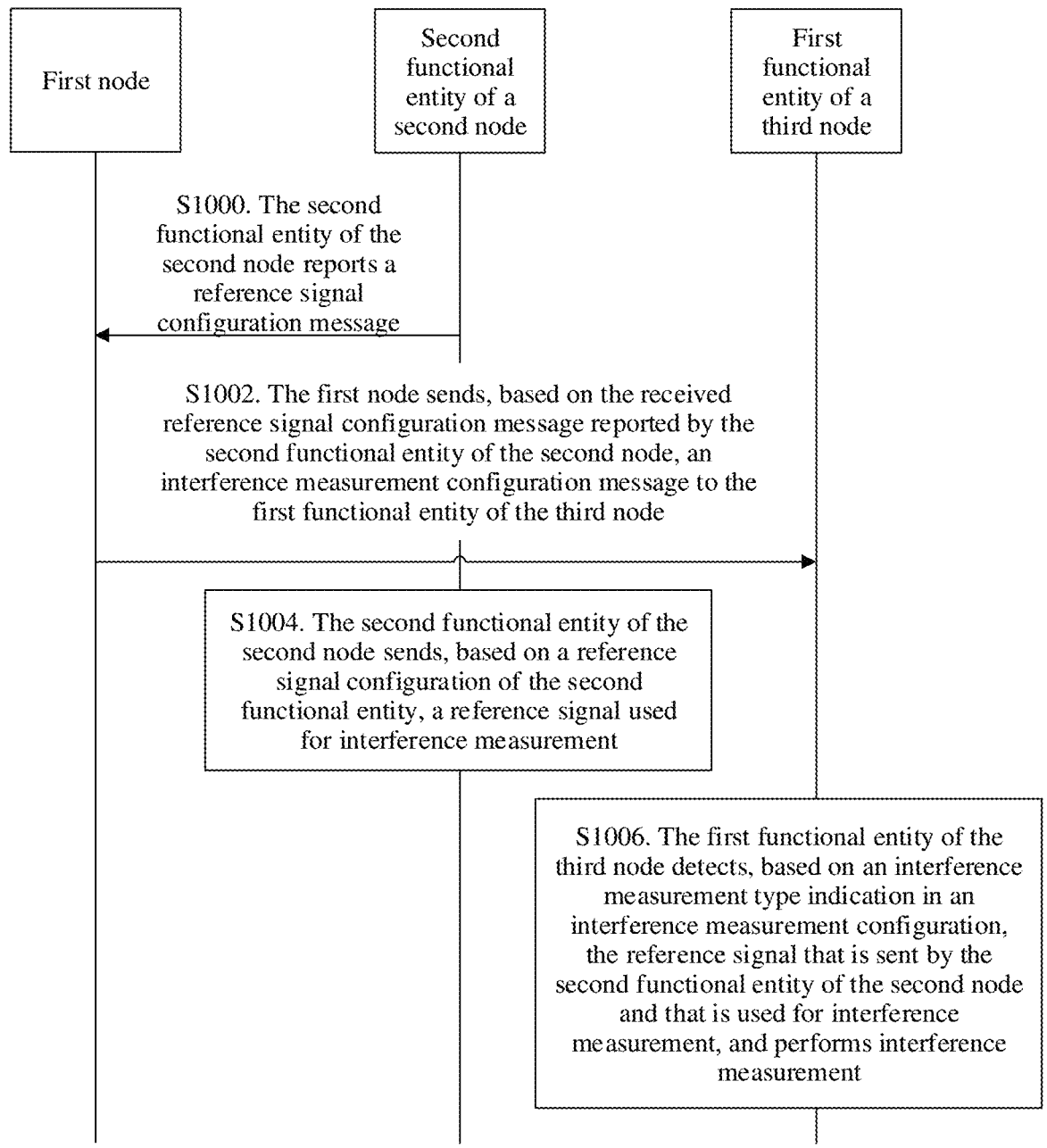
FIG. 10 is another schematic flowchart of interference measurement according to an embodiment of this application.

As shown in FIG. 10, this embodiment of the present disclosure further provides another embodiment.

Figure 11:
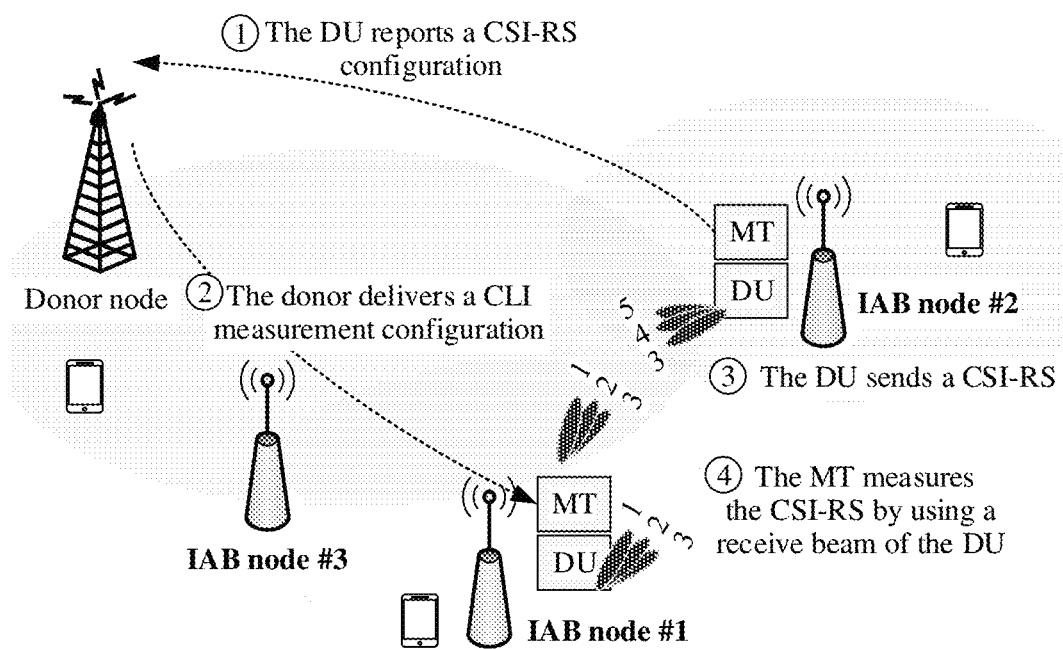
FIG. 11 is a diagram of a system architecture according to an embodiment of this application.

A networking architecture diagram of IAB in FIG. 11 is used as an example for description. However, this embodiment of the present application is not limited to FIG. 11, and may be applied to the foregoing various networking architecture diagrams.

In FIG. 11, an IAB node 1 receives, by a DU, a signal sent by a lower-level IAB node or a terminal device, and an IAB node 2 sends data to the lower-level IAB node or the terminal device by a DU. In this case, when receiving an uplink signal, the DU of the IAB node 1 is interfered with by a downlink signal sent by the DU of the IAB node 2. Herein, an interference source is the DU of the IAB node 2, and an interfered node is the DU of the IAB node 1. The interference may be cross link interference CLI, and the CLI is interference from the DU of the IAB node 2 to the DU of the IAB node 1.

As shown in FIG. 11, cross link interference between the DU of the IAB node 1 and the DU of the IAB node 2 may exist in some slots. Therefore, the cross link interference between the DU of the IAB node 1 and the DU of the IAB node 2 needs to be measured. A specific interference measurement method is as follows.

S1000. A second functional entity of a second node reports a reference signal configuration message, where the reference signal configuration message includes reference signal resource indication information of the second functional entity of the second node, and the reference signal resource indication information of the second functional entity includes a reference signal resource identifier of the second functional entity of the second node.

Specifically, the second functional entity of the second node generates the reference signal resource indication information of the second function entity, where the reference signal resource indication information of the second functional entity includes the reference signal resource identifier of the second functional entity of the second node.

The reference signal resource identifier of the second functional entity of the second node is obtained by the second functional entity of the second node based on a transmit beam of the second functional entity of the second node.

Further, the second functional entity of the second node adds a time-frequency resource used by a reference signal, a transmission periodicity of the reference signal, and transmit power to the reference signal resource indication information, and reports the reference signal resource indication information to a first node by using the reference signal configuration message used for interference measurement.

For a specific format of the reference signal resource indication information, refer to the specific format of the indication information in step S800.

In addition, a reference signal configuration message that is generated by the DU of the IAB node 2 and that is used for interference measurement may be carried in a radio resource control (RRC) protocol message, or carried in an F1-AP (F1-application protocol) protocol-based message through an F1 interface. The F1 interface is an F1 interface between a distributed unit (DU) of the IAB node 2 and a centralized unit (CU) of a donor node.

S1002. A first node sends an interference measurement configuration message to a first functional entity of a third node, where the interference measurement configuration message includes the reference signal resource indication information of the second functional entity of the second node and interference measurement type indication information, and the interference measurement type indication information is used to indicate a first functional entity of the first node to perform interference measurement by using a receive beam of a second functional entity of the first node.

For a format and content of the reference signal resource indication information of the second functional entity of the second node, refer to the specific descriptions of step S1000. The interference measurement type indication information such as DUtoDU-Meas-Type may be added to a reserved field in the foregoing format of the reference signal resource indication information by extending the format of the reference signal resource indication information of the second functional entity of the second node in S1000, or the interference measurement type indication information such as DUtoDU-Meas-Type may be placed in a reserved field of the RS configuration message.

The interference measurement configuration message sent by the first node to the first functional entity of the third node may be sent by the first node to the first functional entity of the third node based on an RRC (radio resource control) protocol, and may be carried in a specific message of the RRC protocol, or may be indicated by using a MAC CE.

As shown in FIG. 11, the foregoing descriptions may be understood as follows: A configuration used for interference measurement sent by the donor node to the MT of the IAB node 1 may be sent by the donor node to the MT of the IAB node 1 based on an RRC (radio resource control) protocol, and may be carried in a specific message of the RRC protocol, or may be indicated by using a MAC CE.

S1004. The second functional entity of the second node sends, based on a reference signal configuration of the second function entity, a reference signal used for interference measurement.

As shown in FIG. 11, the DU of the IAB node 2 sends the reference signal by using a transmit beam of the DU.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

S1006. The first functional entity of the third node detects, according to the interference measurement type indication in the interference measurement configuration, the reference signal that is sent by the second functional entity of the second node and that is used for interference measurement, and performs interference measurement.

As shown in FIG. 11, the MT of the IAB node 1 detects, by using a receive beam of the DU of the IAB node 1 according to the interference measurement type indication, the reference signal sent by the DU of the IAB node 2, and performs interference measurement.

Further, the MT of the IAB node 1 may further detect, based on a time-frequency resource and a periodicity indicated in an interference configuration, the reference signal that is sent by the DU of the IAB node 2 and that is used for interference measurement.

This application provides an interference measurement method, so that an interfered node can quickly and accurately perform interference measurement, thereby greatly reducing impact of cross-link signal transmission and improving transmission performance of a system.

Embodiment 5

Figure 12:
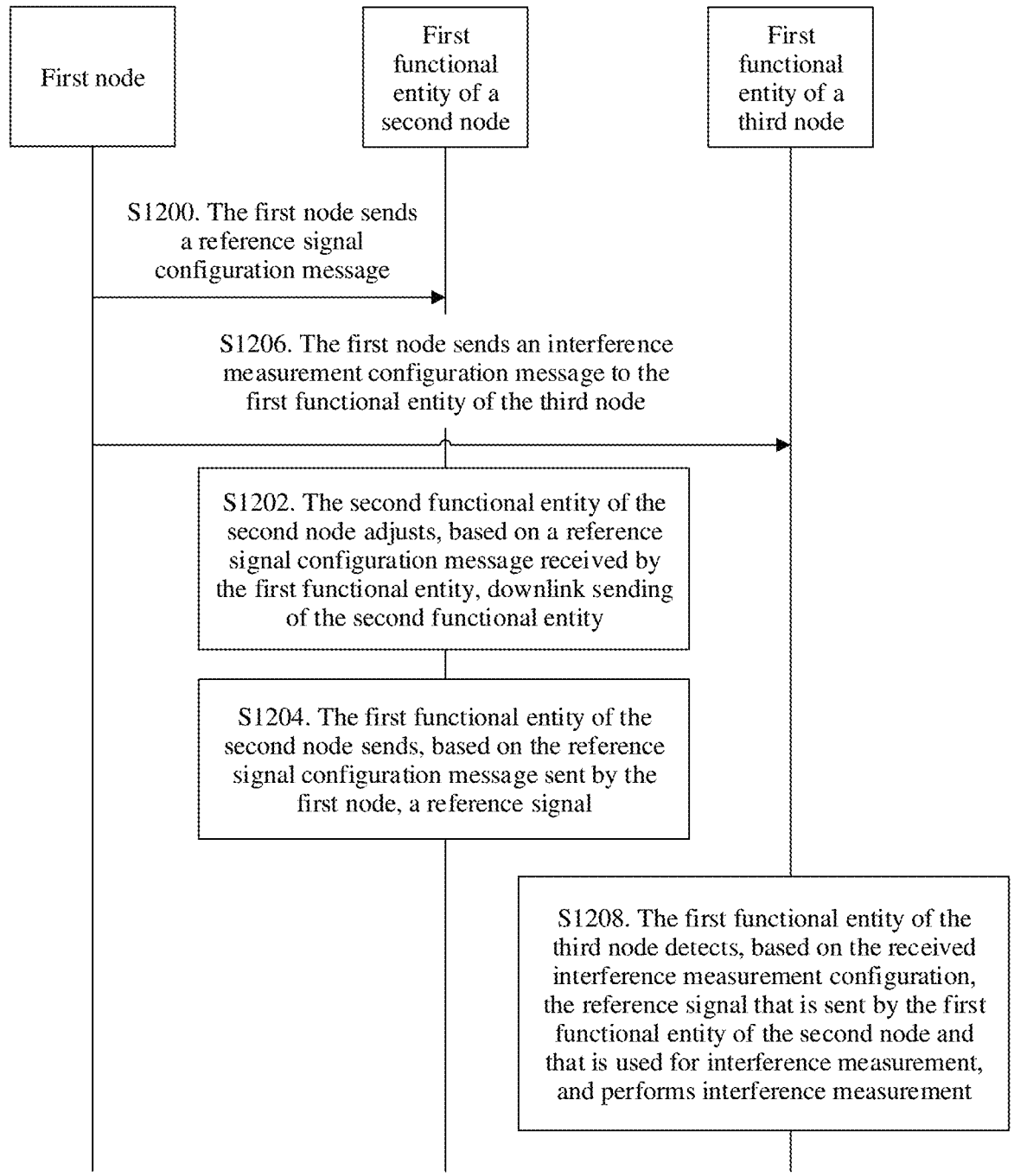
FIG. 12 is another schematic flowchart of interference measurement according to an embodiment of this application.

As shown in FIG. 12, this embodiment of the present disclosure further provides another embodiment.

Figure 13A:
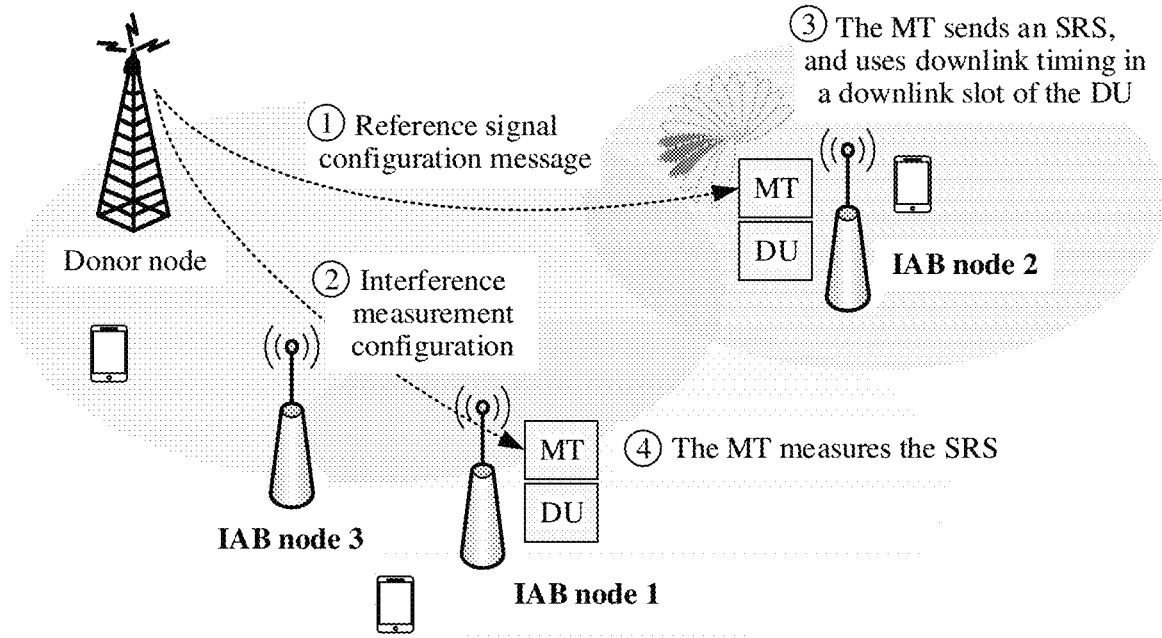
FIG. 13a is a diagram of a system architecture according to an embodiment of this application.

A networking architecture diagram of IAB in FIG. 13a is used as an example for description. However, this embodiment of the present application is not limited to FIG. 13a, and may be applied to the foregoing various networking architecture diagrams.

In FIG. 13a, an IAB node 1 receives, by an MT, a signal sent by an IAB node 3, and an IAB node 2 sends data to a donor node by an MT. In this case, when receiving a downlink signal, the MT of the IAB node 1 is interfered by an uplink signal sent by the MT of the IAB node 2. Herein, an interference source is the IAB node 2, and an interfered node is the IAB node 1. The interference may be specifically cross link interference CLI, and the CLI is interference from the MT of the IAB node 2 to the MT of the IAB node 1.

As shown in FIG. 13a, cross link interference between the MT of the IAB node 1 and the MT of the IAB node 2 may exist in some slots. Therefore, the cross link interference between the MT of the IAB node 1 and the MT of the IAB node 2 needs to be measured. A specific interference measurement method is as follows:

S1200. A first node sends, to a first functional entity of a second node, a reference signal configuration message used for interference measurement, where the reference signal configuration message includes reference signal resource indication information and reference signal transmission timing indication information that are used by the first functional entity of the second node for interference measurement, and the reference signal transmission timing indication information is used to indicate the first functional entity of the second node to send a reference signal by using downlink transmission timing of a second functional entity of the second node.

The reference signal resource indication information used by the first functional entity of the second node for interference measurement includes one or a combination of the following: a reference signal resource identifier of the first function entity, transmit power of the reference signal of the first function entity, a time-frequency resource to which the reference signal of the first functional entity is mapped, and a transmission periodicity of the reference signal of the first function entity.

Specifically, a specific implementation of the reference signal resource indication information may be as follows.

Manner 1: The reference signal resource indication information may use an existing format, for example, an existing SRS-resource information format.

Details are as follows:

```
SRS-Resource ::=                              SEQUENCE {
    srs-ResourceId
    nrofSRS-Ports
    ptrs-PortIndex
    transmissionComb
    resourceMapping
    groupOrSequenceHopping
    resourceType                              CHOICE {
        aperiodic
        SEQUENCE {
            ...
        },
        semi-persistent
        SEQUENCE {
            periodicityAndOffset-sp
            ...
        },
        periodic
        SEQUENCE {
            periodicityAndOffset-p
            ...
        }
    },
    sequenceId
    spatialRelationInfo
    powercontrol
    ...
}
```

SRS-Resource is the reference signal resource indication information.

srs-ResourceId is a common reference signal resource identifier used for uplink measurement.

resourceMapping is a time-frequency resource location to which the reference signal is mapped.

resourceType indicates that a type of the reference signal is aperiodic sending, and/or semi-persistent sending, and/or periodic sending, and indicates a transmission periodicity and an offset in the periodicity during semi-persistent and/or periodic sending.

powercontrol indicates transmit power used by the first functional entity of the second node to send the reference signal.

The time-frequency resource location to which the reference signal is mapped may be in a downlink sending slot of the second node.

Manner 2: A new type of reference signal resource indication information cli-meas-RS-Resource used for interference measurement is defined, and a specific format of the information is the same as the information format in Manner 1.

A specific implementation of the reference signal transmission timing indication information may be as follows.

Manner 1: One bit is used for indication, for example, srs-use-dl-timing: 0 or 1 is used for indication. The first functional entity of the second node is explicitly indicated to send the reference signal by using the downlink transmission timing of the second functional entity of the second node. For the reference signal transmission timing indication information, srs-use-dl-timing may be added to a reserved field in the foregoing format of the reference signal resource indication information by extending the format of the reference signal resource indication information, or srs-use-dl-timing may be placed in a reserved field of the reference signal configuration message.

Manner 2: A new type of reference signal resource indication information used for interference measurement, namely, the foregoing reference signal resource indication information Manner 2, is used to implicitly indicate the first functional entity of the second node to send the reference signal by using the downlink transmission timing of the second functional entity of the second node.

The reference signal configuration message that is sent by the first node to the first functional entity of the second node and that is used for interference measurement may be sent by the first node to the first functional entity of the second node based on an RRC (radio resource control) protocol, and may be carried in a specific message of the RRC protocol, or may be indicated by using a MAC CE.

As shown in FIG. 13a, a reference signal configuration message sent by the donor node to the MT of the LAB node 2 may be sent by the donor node to the MT of the IAB node 2 based on an RRC (radio resource control) protocol, and may be carried in a specific message of the RRC protocol, or may be indicated by using a MAC CE.

S1202. After receiving the reference signal configuration message used for interference measurement, the first functional entity of the second node transmits the reference signal resource indication information in the reference signal configuration message to the second functional entity of the second node. After receiving the reference signal resource indication information, the second functional entity of the second node adjusts downlink sending of the second function entity.

Specifically, the second functional entity of the second node identifies the reference signal identifier, the time-frequency resource location, the transmission periodicity, and the offset in the periodicity that are indicated in the reference signal configuration message, and does not map a normal downlink physical channel in a corresponding beam, the time-frequency resource location, the transmission periodicity, and an offset location in the periodicity when performing normal downlink sending.

Figure 13B:
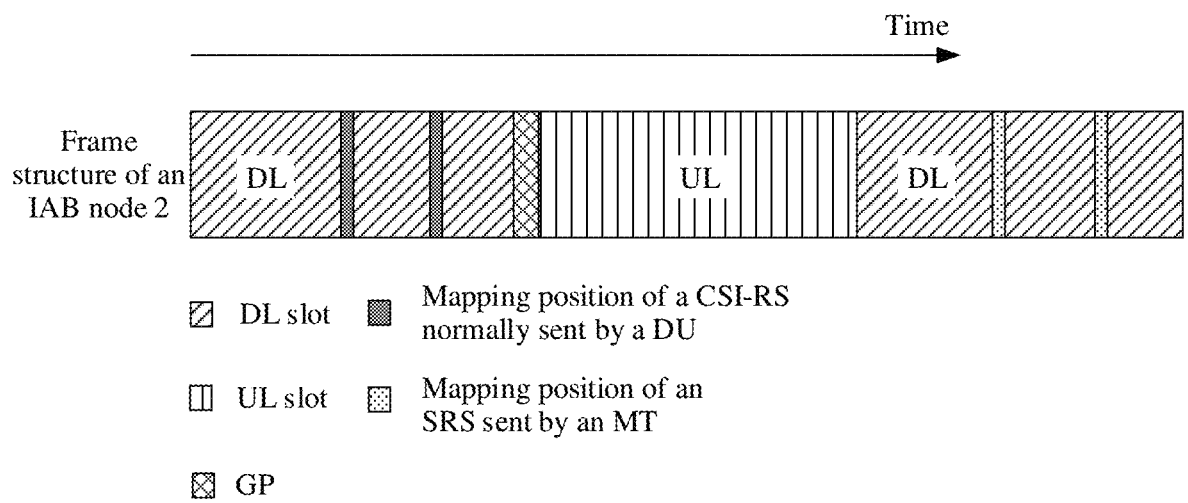
FIG. 13b is a schematic structural block diagram of a frame format according to an embodiment of this application.

As shown in FIG. 13a, the MT of the IAB node 2 transmits the reference signal resource indication information to a DU of the LAB node 2 through internal interaction. As shown in FIG. 13*b*, after the DU of the IAB node 2 obtains the reference signal resource indication information through parsing, the DU of the IAB node 2 does not map any normal downlink physical channel at a time-frequency resource location at which the MT of the IAB node 2 sends the reference signal used for interference measurement.

S1204. The first functional entity of the second node sends the reference signal on a corresponding time-frequency resource in a periodicity based on the reference signal configuration message sent by the first node.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

As shown in FIG. 13*b*, the MT of the IAB node 2 sends an SRS at two symbol locations in a downlink slot, and sends the SRS using downlink timing.

S1206. The first node performs interference measurement configuration on a first functional entity of a third node, and sends an interference measurement configuration message. The interference measurement configuration message includes reference signal resource indication information. Content of the reference signal resource indication information is consistent with that of the reference signal resource indication information in the reference signal configuration message sent by the first node in S1200.

The interference measurement configuration message further includes reference signal type indication information. The reference signal type indication information is used to indicate a type of a currently configured reference signal to the first functional entity of the third node. Specifically, an implementation of the reference signal type indication information may be as follows:

Manner 1: A specific information field reference-signal-type is used for indication, where reference-signal-type may be added to a reserved field in the format of the reference signal resource indication information by extending the format of the reference signal resource indication information, or reference-signal-type may be placed in a reserved field of the interference measurement configuration message.

Manner 2: If the reference signal resource indication information in the interference measurement configuration message uses a common reference signal resource indication information format, a corresponding reference signal type is already displayed, and no additional indication is required. For example, if the reference signal resource indication is SRS-Resource, the corresponding reference signal type SRS is displayed. For another example, if the reference signal resource indication is CSI-RS-Resource, the corresponding reference signal type CSI-RS is displayed.

In addition to being performed after step S1200, step S1206 may be performed before step S1204 of sending the reference signal used for interference measurement.

As shown in FIG. 13*a*, for the MT of the IAB node 1, the donor node performs interference measurement configuration, and sends an interference measurement configuration message. The interference measurement configuration message indicates reference signal resources to be detected by the MT of the IAB node 1, and specifically includes identifiers of these reference signal resources, a time-frequency resource to which a reference signal is mapped, a transmission periodicity of the reference signal, a slot offset in the periodicity, transmit power of the reference signal, and the like. The interference measurement configuration also indicates a type of a corresponding reference signal, and is used by the MT of the IAB node 1 to detect the reference signal.

S1208. The first functional entity of the third node detects, based on the interference measurement configuration in step S1206, the reference signal that is sent by the first functional entity of the second node and that is used for interference measurement, and performs interference measurement.

As shown in FIG. 13*a*, the MT of the IAB node 1 detects, by using a sequence corresponding to the indicated reference signal type on the specified reference signal resource in the interference measurement configuration and by using a receive beam of the MT of the IAB node 1 based on the interference measurement configuration, the reference signal sent by the MT of the IAB node 2.

This application provides the foregoing interference measurement method, so that an interfered node can quickly and accurately perform interference measurement, thereby greatly reducing impact of cross-link signal transmission and improving transmission performance of a system.

Embodiment 6

Figure 14:
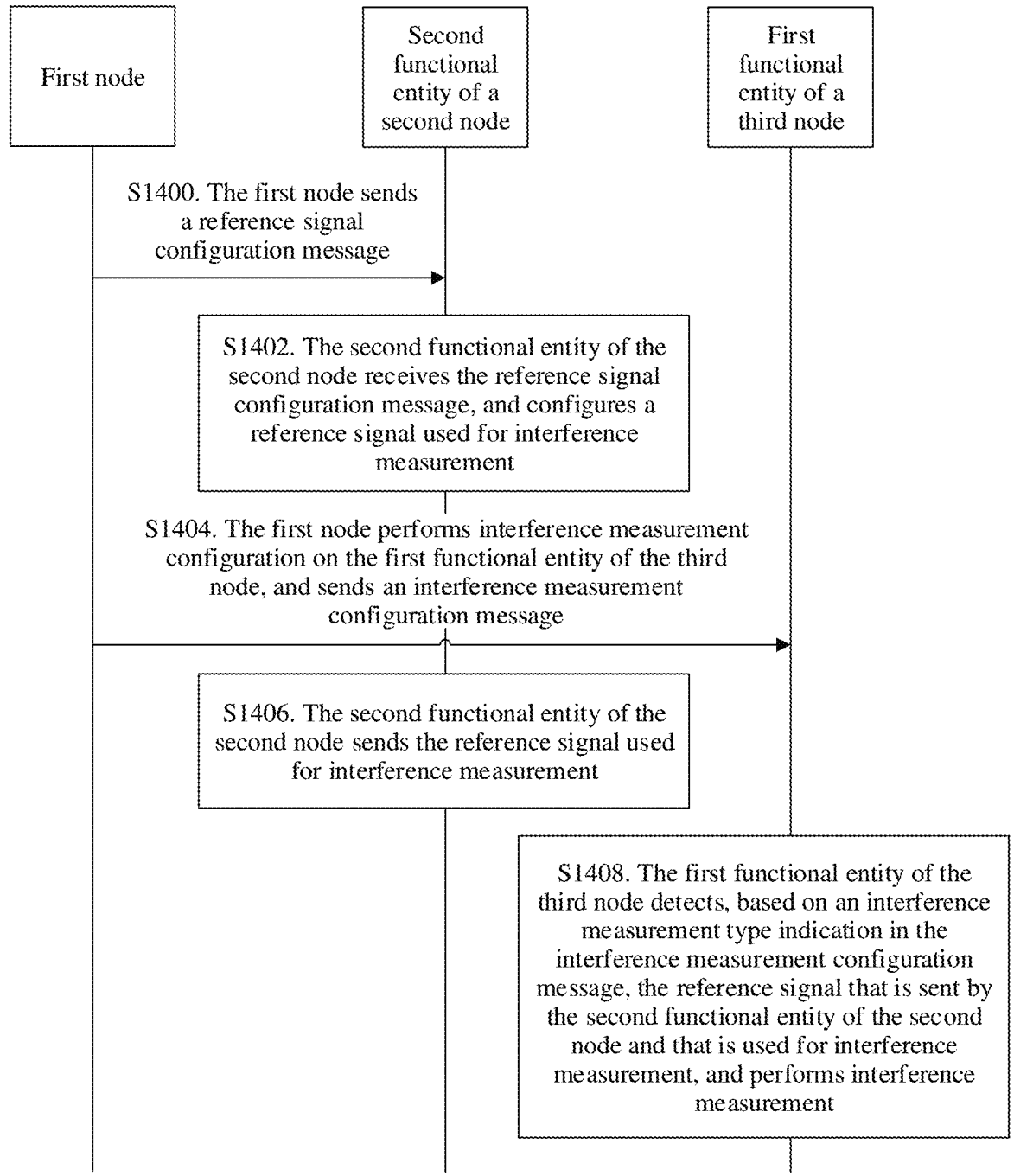
FIG. 14 is another schematic flowchart of interference measurement according to an embodiment of this application.

As shown in FIG. 14, this embodiment of the present disclosure further provides a schematic flowchart of a method according to another embodiment.

Figure 15:
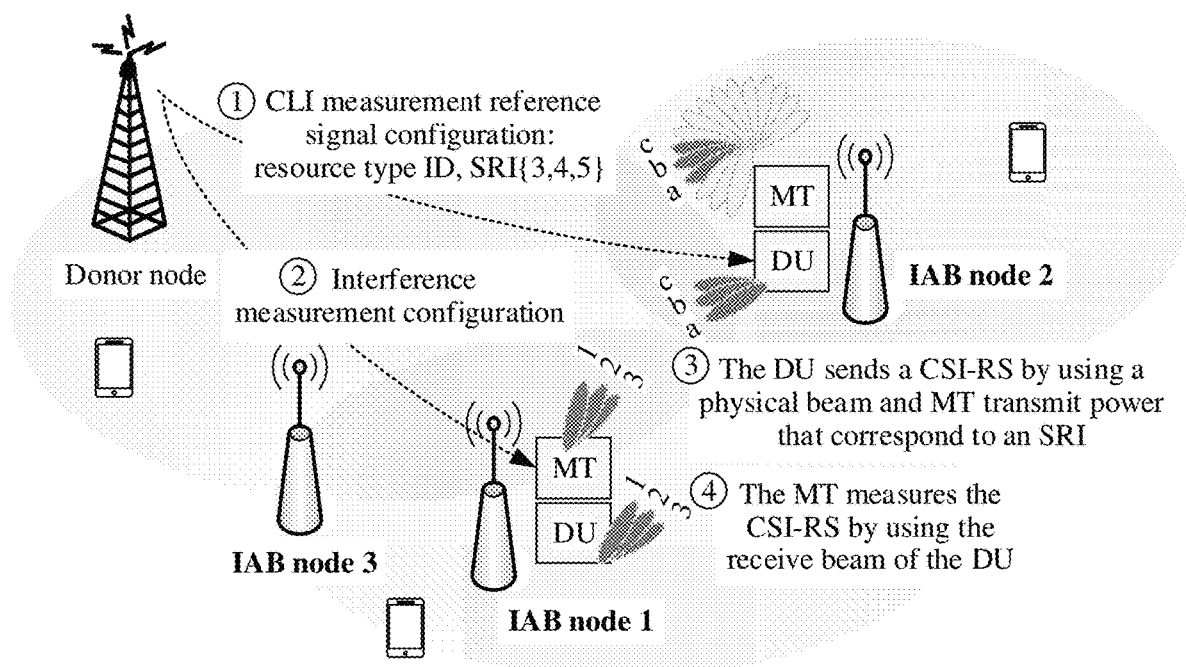
FIG. 15 is a diagram of a system architecture according to an embodiment of this application.

A networking architecture diagram of IAB in FIG. 15 is used as an example for description. However, this embodiment of the present application is not limited to FIG. 15, and may be applied to the foregoing various networking architecture diagrams.

In FIG. 15, an IAB node 1 receives, by a DU, a signal sent by a lower-level node of the IAB node 1 or a terminal, and an IAB node 2 sends data to a donor node by an MT. In this case, when receiving an uplink signal, the DU of the IAB node 1 is interfered by an uplink signal sent by the MT of the IAB node 2. Herein, an interference source is the IAB node 2, and an interfered node is the IAB node 1. The interference may be specifically cross link interference CLI, and the CLI is interference from the MT of the LAB node 2 to the DU of the IAB node 1.

As shown in FIG. 15, cross link interference between the DU of the LAB node 1 and the MT of the LAB node 2 may exist in some slots. Therefore, the cross link interference between the DU of the LAB node 1 and the MT of the IAB node 2 needs to be measured. A specific interference measurement method is as follows.

S1400. A first node sends a reference signal (reference signal, RS) configuration message, where the RS configuration message includes reference signal resource indication information of a second functional entity of a second node, and the reference signal resource indication information of the second functional entity includes a reference signal resource identifier of a first functional entity of the second node. The RS configuration message is used to configure a reference signal sent by the second functional entity of the second node, the reference signal sent by the second functional entity of the second node is used to measure interference, and the interference is interference from the first functional entity of the second node to a first functional entity of a third node.

The second node is an interference-generating node, and the third node is an interfered node. The reference signal resource identifier of the first functional entity of the second node is used to indicate a reference signal resource.

In an IAB network shown in FIG. 15, the first node is the donor node, the second node is an interference-generating node such as the IAB node 2, and the third node is an interfered node such as the LAB node 1. The second node and the third node each may include a first functional entity and a second function entity. The first functional entity is an MT, and the second functional entity is a DU. Herein, the first functional entity and the second functional entity may be integrated into one module, or may be independent and separated into different modules. The first functional entity is an MT or a DU, and the second functional entity is a DU or an MT. The first node may be alternatively an IAB node.

Based on a configuration or a capability of the LAB node 2 or the IAB node 1, the IAB node 2 may transmit a signal by using one or more beams at a same moment, and the IAB node 1 may also transmit a signal by using one or more beams at a same moment. The beam may be indicated by a reference signal resource identifier. The reference signal resource identifier of the first functional entity of the second node is a reference signal resource identifier of the MT of the IAB node 2, and is used to indicate one or more reference signal resources used by the MT of the IAB node 2 to send a reference signal. The one or more reference signal resources correspond to one or more transmit beams of the MT. Optionally, the reference signal resource identifier of the first functional entity of the second node may be a configured resource identifier (ID) of a reference signal of an IAB node, for example, a resource identifier (CSI-RS-ResourceId) of a channel state information-reference signal (CSI-RS) or a resource identifier (SRS-ResourceId) of a sounding reference signal (SRS).

The reference signal configuration message may be carried in a radio resource control (RRC) protocol message, or carried in an F1-AP (F1-application protocol) protocol-based message through an F1 interface, for example, a downlink radio resource control transfer message (DL RRC TRANSFER message), where the F1 interface is an F1 interface between a distributed unit (DU) of the IAB node 2 and a centralized unit (CU) of the donor node, or carried in a DCI (Downlink Control Information) message or a MAC CE (Media Access Control control element).

The reference signal configuration message may be alternatively sent by the donor node to the MT of the IAB node 2 by using RRC, DCI, or a MAC CE, and then the MT of the IAB node 2 notifies the DU of the IAB node 2 through internal signaling interaction.

The reference signal configuration message may be periodically sent or may be semi-statically sent.

The reference signal configuration message includes one or more pieces of reference signal resource indication information, and each piece of reference signal resource indication information includes a reference signal resource identifier.

Specifically, a format of the reference signal resource indication information is as follows:

1. Manner 1: A new type of reference signal resource indication information is defined, and an example of a specific format of the indication information is as follows:

| RS-Resource ::= | SEQUENCE |
|---|---|
| | RS-ResourceId |
| | resourceMapping |
| | powercontrol |
| | periodicityAndOffset...... |
| } | |

RS-Resource is the reference signal resource indication information.

RS-ResourceId is a reference signal resource identifier, and it may be understood that the reference signal resource identifier indicates the DU of the IAB node 2 to send the reference signal by using a beam that is of the MT of the IAB node 2 and that is corresponding to the identifier.

Optionally, the reference signal resource indication information may further include one or more of the following: resourceMapping: indicating a time-frequency resource location to which the reference signal used for interference measurement is mapped; powercontrol: power control of the reference signal, where the power control of the reference signal indicates transmit power used by the DU of the IAB node 2 to send the reference signal, and the transmit power of the reference signal is configured as transmit power of the MT of the IAB node 2; and periodicityAndOffset: indicating a transmission periodicity of the reference signal used for interference measurement and/or a slot offset in each periodicity.

2. Manner 2: The reference signal resource indication information uses a unified format, for example, an existing CSI-RS-Resource message format, and a CSI-RS-Resource message is extended.

Details are as follows:

CSI-RS resource indication information CSI-RS-Resource is shown as follows:

| CSI-RS-Resource ::= | SEQUENCE { |
|---|---|
| | CSI-RS-ResourceId |
| | SRS-ResourceId |
| | resourceMapping |
| | powerControl |
| | periodicityAndOffset... |
| } | |

CSI-RS-Resource is the reference signal resource indication information.

CSI-RS-ResourceId is a common reference signal resource identifier used for CSI measurement, and is used to indicate the DU of the IAB node 2 to send, by using a beam configured by the DU, a reference signal used for CSI measurement.

SRS-ResourceId is a reference signal resource identifier, and the reference signal resource identifier is used to indicate the DU of the IAB node 2 to send the reference signal by using a beam that is of the MT of the IAB node 2 and that is corresponding to the identifier.

resourceMapping is used to indicate a time-frequency resource location to which the reference signal is mapped.

powercontrol is power control of the reference signal and indicates transmit power used by the DU of the IAB node 2 to send the reference signal.

periodicityAndOffset indicates a transmission periodicity of the reference signal used for interference measurement and/or a slot offset in each periodicity.

When the donor node sends the reference signal configuration message to the DU of the IAB node 2, if the DU of the IAB node 2 identifies SRS-ResourceId included in the reference signal configuration message, it may be learned that a current reference signal configuration is used for interference measurement, and is specifically used for cross link interference measurement.

The powerControl field indicates power used for sending the reference signal. If a reference signal resource used for channel state information CSI measurement is currently indicated, the field is set as transmit power information of a CSI-RS. When a reference signal resource used for cross link interference CLI measurement is indicated, the field is set as transmit power information of an SRS.

Specifically, taking FIG. 15 as an example, step S1400 may be understood as follows.

When the DU of the IAB node 1 is interfered with by the MT of the IAB node 2, the donor node generates an RS configuration message. The RS configuration message is used to configure a reference signal that is sent by the DU of the IAB node 2 and that is used for interference measurement. The reference signal used for interference measurement is used by an MT of the IAB node 1 to measure interference from the MT of the IAB node 2, and the RS configuration message includes reference signal resource identifiers such as {3, 4, 5} of the DU of the IAB node 2, and the reference signal resource identifiers correspond to beams of the MT of the LAB node 2.

S1402. The second functional entity of the second node configures, based on the received RS configuration message, a reference signal used for interference measurement.

As shown in FIG. 15, the DU of the IAB node 2 selects a corresponding beam based on the reference signal resource identifier to send the reference signal.

A correspondence between a reference signal resource identifier and a beam specifically used for transmitting a signal is known to the MT of the IAB node 2. However, in the IAB node 2, the DU may interact with the MT, so that the DU can also identify the beams of the MT that are corresponding to the SRIs {3, 4, 5}, for example, three physical beams identified by shadows in FIG. 15.

For example, the MT of the IAB node 2 transmits a signal by using a beam set {a, b, c} corresponding to the reference signal resource identifiers {3, 4, 5}. When the MT of the IAB node 1 performs interference measurement on the MT of the IAB node 2, the DU of the IAB node 2 interacts with the MT of the IAB node 2 to obtain the beam set {a, b, c} that is of the MT of the IAB node 2 and that is corresponding to the reference signal resource identifiers {3, 4, 5}, and the DU of the IAB node 2 sends, by using the beam set {a, b, c}, the reference signal used for interference measurement.

It should be noted that interaction between the MT and the DU that are of the IAB node 2 may be interaction between hardware modules, or may be implemented by using software when the MT and the DU are integrated. Further, the reference signal resource indication information in the RS configuration message further includes one or a combination of the following: the time-frequency resource to which the reference signal of the DU of the IAB node 2 is mapped, the transmit power of the reference signal of the DU of the IAB node 2, or the transmission periodicity of the reference signal of the DU of the IAB node 2.

Because the DU of the IAB node 2 configures, based on information (a transmit beam and transmit power) about the MT of the IAB node 2, the reference signal used for interference measurement, and the reference signal is sent by the DU of the IAB node 2 instead of the MT of the IAB node 2, so that the IAB node 1 can accurately detect the reference signal used for interference measurement, to measure interference and eliminate the interference, thereby greatly improving performance of the IAB network.

S1404. The first node sends an interference measurement configuration message to the first functional entity of the third node, where the interference measurement configuration message includes the reference signal resource indication information of the second functional entity of the second node and/or interference measurement type indication information, and the interference measurement type indication information is used to indicate the first functional entity of the third node to perform interference measurement by using a receive beam of a second functional entity of the third node.

For a format and content of the reference signal resource indication information of the second functional entity of the second node, refer to the specific descriptions of step S800. The interference measurement type indication information such as MTtoDU-Meas-Type may be added to a reserved field in the foregoing format of the reference signal resource indication information by extending the format of the reference signal resource indication information of the second functional entity of the second node in S800, or the interference measurement type indication information such as MTtoDU-Meas-Type may be placed in a reserved field of the RS configuration message.

The interference measurement configuration message sent by the first node to the first functional entity of the third node may be sent by the first node to the first functional entity of the third node based on an RRC (Radio Resource Control) protocol, and is carried in a specific message of the RRC protocol, or may be indicated by using a MAC CE.

As shown in FIG. 15, the foregoing descriptions may be understood as follows: A configuration used for interference measurement sent by the donor node to the MT of the IAB node 1 may be sent by the donor node to the MT of the IAB node 1 based on an RRC (Radio Resource Control, radio resource control) protocol, and may be carried in a specific message of the RRC protocol, or may be indicated by using a MAC CE.

S1406. The second functional entity of the second node sends the reference signal used for interference measurement.

As shown in FIG. 15, the DU of the IAB node 2 sends, by using one or more beams corresponding to the reference signal resource identifier in the RS configuration message, the reference signal used for interference measurement, so that the MT of the IAB node 1 performs interference measurement.

Further, the DU of the IAB node 2 may further send, on a specified time-frequency resource, the reference signal used for interference measurement. If periodic measurement needs to be performed, the DU of the LAB node 2 further periodically sends the reference signal in a specified transmission periodicity, and sends the reference signal by using specified transmit power.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

S1408. The first functional entity of the third node detects, according to the interference measurement type indication in the interference measurement configuration, the reference signal that is sent by the second functional entity of the second node and that is used for interference measurement, and performs interference measurement.

As shown in FIG. 15, the MT of the LAB node 1 detects, by using a receive beam of the DU of the LAB node 1 according to the interference measurement type indication, the reference signal sent by the DU of the LAB node 2, and performs interference measurement.

Further, the MT of the IAB node 1 may further detect, based on a time-frequency resource and a periodicity indicated in an interference configuration, the reference signal that is sent by the DU of the IAB node 2 and that is used for interference measurement.

Embodiment 7

Figure 16:
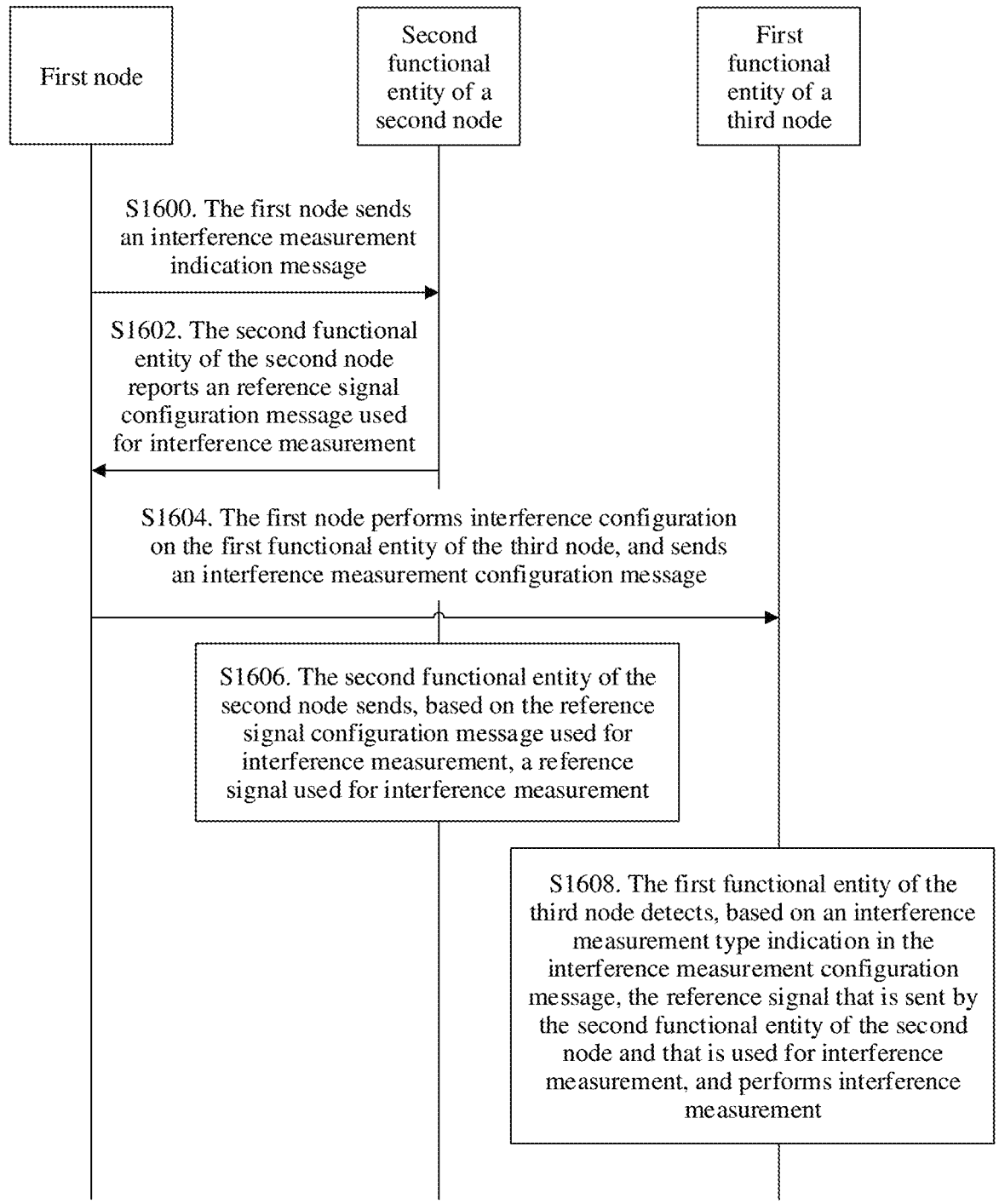
FIG. 16 is another schematic flowchart of interference measurement according to an embodiment of this application.

As shown in FIG. 16, this embodiment of the present disclosure further provides a flowchart of a method according to another embodiment.

Figure 17:
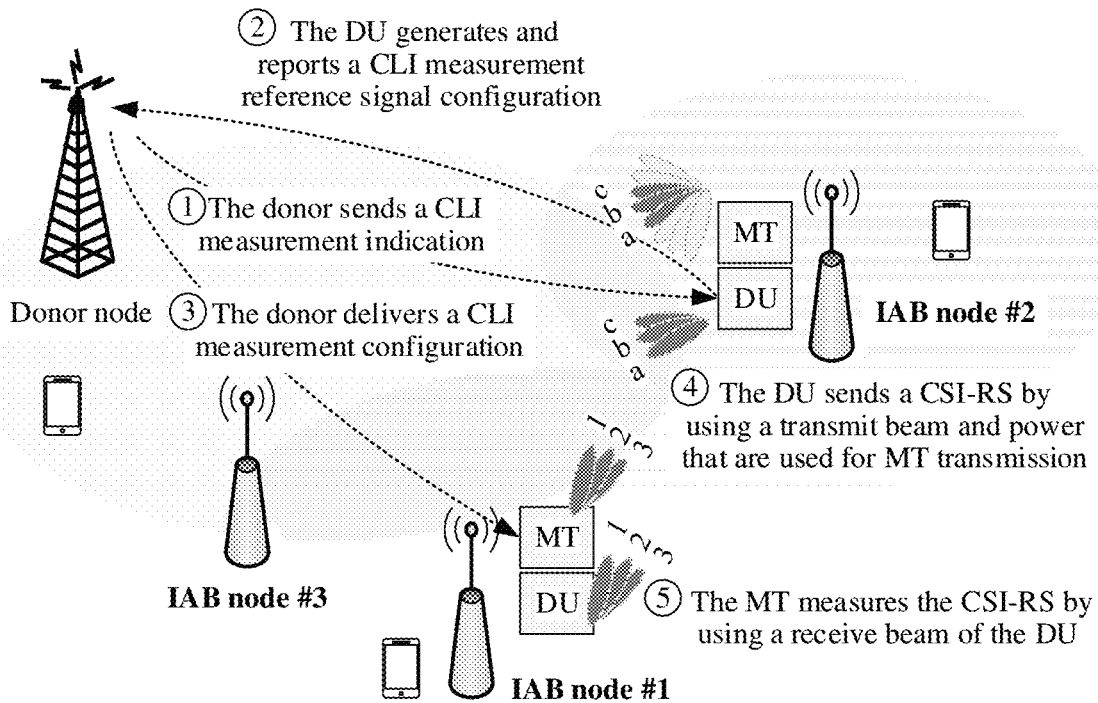
FIG. 17 is a diagram of a system architecture according to an embodiment of this application.

A networking architecture diagram of IAB in FIG. 17 is used as an example for description. However, this embodiment of the present application is not limited to FIG. 17, and may be applied to the foregoing various networking architecture diagrams.

In FIG. 17, an IAB node 1 receives, by using a DU, a signal sent by a lower-level node of the LAB node 1 or a terminal, and an IAB node 2 sends data to a donor node by using an MT. In this case, when receiving an uplink signal, the DU of the IAB node 1 is interfered by an uplink signal sent by the MT of the IAB node 2. Herein, an interference source is the IAB node 2, and an interfered node is the IAB node 1. The interference may be specifically cross link interference CLI, and the CLI is interference from the MT of the IAB node 2 to the DU of the LAB node 1.

As shown in FIG. 17, cross link interference between the DU of the IAB node 1 and the MT of the LAB node 2 may exist in some slots. Therefore, the cross link interference between the DU of the LAB node 1 and the MT of the IAB node 2 needs to be measured. A specific interference measurement method is as follows.

S1600. A first node sends an interference measurement indication message, where the interference measurement indication message is used to indicate a second functional entity of a second node to report a reference signal configuration message used for interference measurement.

As shown in FIG. 17, the donor node sends an interference measurement indication message to a DU of the IAB node 2, to indicate the DU of the IAB node 2 to generate and report reference signal configuration information used for interference measurement.

The interference measurement indication message may be carried in a radio resource control (RRC) protocol message, or carried in an F1-AP (F1-application protocol) protocol-based message through an F1 interface, for example, a downlink radio resource control transfer message (DL RRC TRANSFER message). The F1 interface is an F1 interface between a distributed unit (DU) of the IAB node 2 and a centralized unit (CU) of the donor node.

The interference measurement indication message may be alternatively sent by the donor node to the MT of the IAB node 2 by using RRC, DCI, or a MAC CE, and then the MT of the IAB node 2 notifies the DU of the IAB node 2 through internal signaling interaction, so that the DU of the IAB node 2 generates and reports the reference signal configuration information used for interference measurement.

Specific implementations of the interference measurement indication message include the following several manners.

Manner 1: One bit is used for indication, and the second functional entity of the second node is triggered to generate and report the reference signal configuration information used for interference measurement, for example, CLI-Meas-Indicator: 0 or 1 is used for indication.

Manner 2: The interference measurement indication message includes one or a combination of the following: a transmission slot or a transmission periodicity of a reference signal that is sent by the second functional entity of the second node and that is used for interference measurement, and the second functional entity of the second node is triggered, by using the foregoing message, to generate and report the reference signal configuration information used for interference measurement. For example, this is implemented by using the following message format of the indication message:

---

CLI-Meas-Indicator ::= SEQUENCE {
  sfnForCliMeas OPTIONAL
  periodicityAndOffset
  ...

--- sfnForCliMeas indicates the transmission slot of the reference signal used for interference measurement, and periodicityAndOffset indicates the transmission periodicity of the reference signal used for interference measurement and/or a slot offset in each periodicity.

Manner 3: Manner 3 is implemented by combining Manner 1 with Manner 2. Specifically, the second functional entity of the second node is triggered by using Manner 1 to generate the reference signal configuration information used for interference measurement, and then the transmission slot or the transmission periodicity of the reference signal that is sent by the second functional entity of the second node and that is used for interference measurement is indicated by using Manner 2.

S1602. The second functional entity of the second node reports the reference signal configuration message used for interference measurement, where the reference signal configuration message includes reference signal resource indication information of the second functional entity of the second node, and the reference signal resource indication information of the second functional entity includes a reference signal resource identifier of the second functional entity of the second node.

Specifically, the second functional entity of the second node generates the reference signal resource indication information of the second function entity, where the reference signal resource indication information of the second functional entity includes the reference signal resource identifier of the second functional entity of the second node.

The reference signal resource identifier of the second functional entity of the second node is obtained by the second functional entity of the second node based on a transmit beam of the first functional entity of the second node.

Further, when configuring transmit power of the reference signal, the second functional entity of the second node uses transmit power of the first functional entity of the second node as the transmit power of the reference signal of the second functional entity of the second node, and configures a time-frequency resource used by the reference signal and the sending periodicity of the reference signal. The second functional entity of the second node adds the transmit power, the time-frequency resource, and the sending periodicity to the reference signal resource indication information, and reports the reference signal resource indication information to the first node by using the reference signal configuration message used for interference measurement.

As shown in FIG. 17, a specific format of the reference signal resource indication information is as follows.

A new type of reference signal resource indication information is defined, and an example of a specific format of the indication information is as follows:

```
RS-Resource ::=    SEQUENCE {
                   RS-ResourceId
                   resourceMapping
                   powercontrol
                   periodicityAndOffset
                   ...
}
```

RS-Resource is the reference signal resource indication information.

RS-ResourceId is a reference signal resource identifier.

Optionally, the reference signal resource indication information may further include one or more of the following: resourceMapping: indicating a time-frequency resource location to which the reference signal is mapped; power-control: power control of the reference signal, where the power control indicates transmit power used by the DU of the IAB node 2 to send the reference signal, and the transmit power of the reference signal is configured as transmit power of the MT of the IAB node 2; and periodicityAndOffset: indicating a transmission periodicity of the reference signal used for interference measurement and/or a slot offset in each periodicity.

When the transmit power and the time-frequency resource described above are configured by the first node, refer to delivering of the reference signal configuration message to the second functional entity of the second node provided in FIG. 4a, FIG. 4b, and FIG. 5. Alternatively, the transmit power and the time-frequency resource may be sent to the second functional entity of the second node by using another message.

Specifically, a process of obtaining the transmit beam of the first functional entity of the second node and the transmit power of the first functional entity of the second node is as follows:

As shown in FIG. 17, the DU of the IAB node 2 obtains a transmit beam and transmit power of the MT of the IAB node 2 by exchanging information with the MT of the IAB node 2, and the DU of the IAB node 2 generates a reference signal resource identifier based on the obtained transmit beam of the MT.

Transmit beam information herein may be a beam or a beam set used by the MT to send an SRS last time, or may be a beam or a beam set corresponding to an SRI that is configured by the donor node and that is received by the MT of the IAB node 2 last time, and each of these beams corresponds to one SRI.

The DU of the LAB node 2 sends, by using the transmit beam and the transmit power of the MT of the LAB node 2, the reference signal used for interference measurement.

The reference signal configuration message that is generated by the DU of the IAB node 2 and that is used for interference measurement includes one or more pieces of reference signal resource indication information, and each piece of reference signal resource indication information corresponds to one transmit beam. For example, if the MT notifies the DU of 16 beams, the DU generates 16 pieces of reference resource indication information, and the 16 pieces of reference resource indication information are included in the reference signal configuration message.

In addition, the reference signal configuration message that is generated by the DU of the LAB node 2 and sent to the donor node and that is used for interference measurement may be carried in a radio resource control (RRC) protocol message, or carried in an F1-AP (F1-application protocol) protocol-based message through an F1 interface. The F1 interface is an F1 interface between a distributed unit (DU) of the IAB node 2 and a centralized unit (CU) of the donor node.

S1604. The first node sends an interference measurement configuration message to a first functional entity of a third node, where the interference measurement configuration message includes the reference signal resource indication information of the second functional entity of the second node and/or interference measurement type indication information, and the interference measurement type indication information is used to indicate the first functional entity of the third node to perform interference measurement by using a receive beam of a second functional entity of the third node.

For a format and content of the reference signal resource indication information of the second functional entity of the second node, refer to the specific descriptions of step S800. The interference measurement type indication information such as MTtoDU-Meas-Type may be added to a reserved field in the foregoing format of the reference signal resource indication information by extending the format of the reference signal resource indication information of the second functional entity of the second node in S800, or the interference measurement type indication information such as MTtoDU-Meas-Type may be placed in a reserved field of the RS configuration message.

The interference measurement configuration message sent by the first node to the first functional entity of the third node may be sent by the first node to the first functional entity of the third node based on an RRC (radio resource control) protocol, and may be carried in a specific message of the RRC protocol, or may be indicated by using a MAC CE.

As shown in FIG. 17, the foregoing descriptions may be understood as follows: A configuration used for interference measurement sent by the donor node to the MT of the LAB node 1 may be sent by the donor node to the MT of the IAB node 1 based on an RRC (radio resource control) protocol, and is carried in a specific message of the RRC protocol, or may be indicated by using a MAC CE.

S1606. The second functional entity of the second node sends, based on the reference signal configuration message used for interference measurement, a reference signal used for interference measurement.

As shown in FIG. 17, the DU of the IAB node 2 obtains transmit beams of the MT of the LAB node 2, and sends the reference signal on these beams.

Further, the DU of the IAB node 2 sends, on a time-frequency resource configured by the DU or a specified time-frequency resource, the reference signal used for interference measurement. If periodic measurement needs to be performed, the DU of the LAB node 2 further periodically sends the reference signal in a transmission periodicity configured by the DU or a specified transmission periodicity, and sends the reference signal by using specified transmit power or transmit power configured by the DU.

The reference signal may include one or more of the following: a synchronization signal SSB, a channel state information-reference signal CSI-RS, a demodulation reference signal DMRS, a tracking reference signal TRS, a phase tracking reference signal PTRS, a sounding reference signal SRS, or another RS.

S1608. The first functional entity of the third node detects, according to the interference measurement type indication in the interference measurement configuration, the reference signal that is sent by the second functional entity of the second node and that is used for interference measurement, and performs interference measurement.

As shown in FIG. 17, the MT of the LAB node 1 detects, by using a receive beam of the DU of the LAB node 1 according to the interference measurement type indication, the reference signal sent by the DU of the IAB node 2, and performs interference measurement.

Further, the MT of the IAB node 1 may further detect, based on a time-frequency resource and a periodicity indicated in an interference configuration, the reference signal that is sent by the DU of the IAB node 2 and that is used for interference measurement.

The interference measurement method in the embodiments of this application is described in detail above with reference to FIG. 1 to FIG. 16. The following describes an interference measurement apparatus in the embodiments of this application with reference to figures. It should be understood that technical features described in the method embodiments are also applicable to the following apparatus embodiments.

Figure 18:
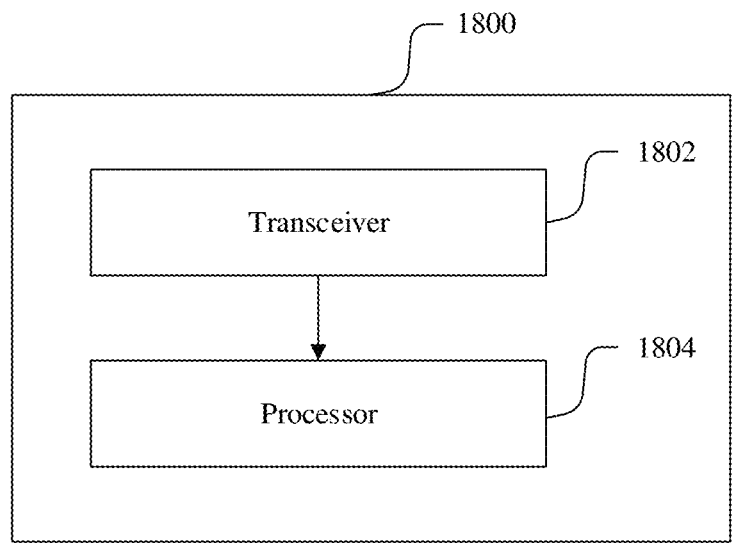
FIG. 18 is a schematic block diagram of an interference measurement apparatus according to an embodiment of this application.

FIG. 18 is a schematic block diagram of an interference measurement apparatus according to an embodiment of this application. The apparatus is configured to perform the method in the foregoing method Embodiment 1. Optionally, a specific form of the apparatus may be a relay node or a chip in a relay node, or may be a terminal device or a chip in a terminal device. This is not limited in this embodiment of this application.

Taking FIG. 4a, FIG. 4b, and FIG. 5 as an example, the interference measurement apparatus is a second node.

The apparatus includes: a transceiver 1802 and a processor 1804.

The transceiver 1802 is configured to: receive an RS configuration message, where the RS configuration message includes reference signal resource indication information of a second functional entity of the second node, and the reference signal resource indication information of the second functional entity includes a reference signal resource identifier of a first functional entity of the second node; and send, by using determined one or more transmit beams according to an indication of the processor, an RS used for interference measurement.

The processor 1804 is configured to: determine, based on the reference signal resource identifier of the first functional entity of the second node in the RS configuration message, the one or more transmit beams corresponding to the reference signal resource identifier of the first functional entity of the second node, and indicate the transceiver to send, by using the determined transmit beam, the RS used for interference measurement.

The interference measurement apparatus is configured to perform the interference measurement methods shown in FIG. 4a, FIG. 4b, and FIG. 5. Related technical features have been described in detail above with reference to the methods shown in FIG. 4a, FIG. 4b, and FIG. 5. Therefore, details are not described herein again. It should be noted that, in the interference measurement methods shown in FIG. 4a, FIG. 4b, and FIG. 5 that may be implemented by the interference measurement apparatus, each of the nodes in Embodiment 1, for example, the first node, the second node, and the third node, includes a transceiver and a processor, a sending or receiving action of each node in the method embodiments may be performed by the transceiver, and other actions such as processing and determining are performed by the processor.

Further, as described above, for the measurement methods in FIG. 6 and FIG. 7 in Embodiment 2, this embodiment of the present disclosure is also applied to the foregoing apparatus structure. The apparatus includes a transceiver and a processor. A receiving or sending step of each node is performed by the transceiver of each node, and specific actions such as processing, determining, calculation, and judging are performed by the processor of each node. Details are not described herein again.

This application provides an interference measurement apparatus. A second functional entity of an interference-generating node sends, by using one or more beams corresponding to a reference signal resource identifier of a first functional entity of the interference-generating node, a reference signal used for interference measurement, so that an interfered node can quickly and accurately perform interference measurement, thereby greatly reducing impact of cross-link signal transmission and improving transmission performance of a system.

Figure 19:
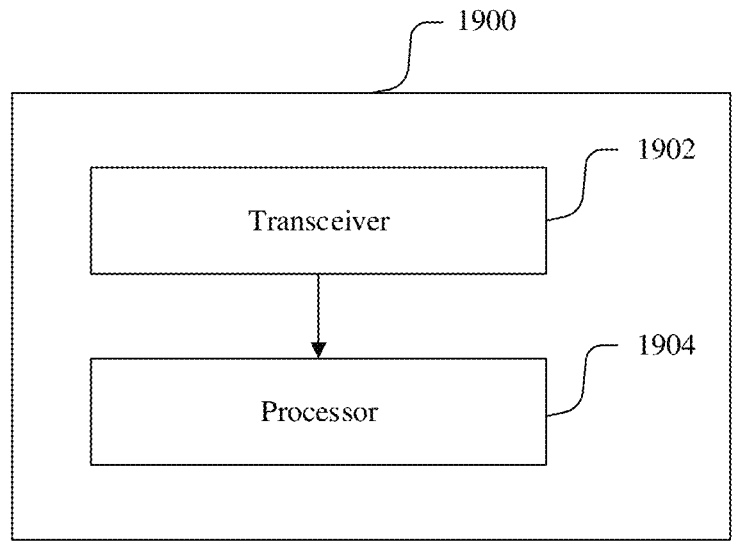
FIG. 19 is a schematic block diagram of another power control apparatus according to an embodiment of this application.

FIG. 19 is a schematic diagram of a logical structure of another interference measurement apparatus according to an embodiment of the present disclosure. In a specific implementation process, the interference measurement apparatus may be a network device or a relay device, and the relay device may be a base station. The interference measurement apparatus includes a transceiver 1902 and a processor 1904. Taking FIG. 8a, FIG. 8b, and FIG. 9 as examples, the interference measurement apparatus is a third node.

The transceiver 1902 configured to: receive an interference measurement configuration message, where the interference measurement configuration message includes interference measurement type indication information, and the interference measurement type indication information is used to indicate a first functional entity of the third node to perform interference measurement by using a receive beam of a second functional entity of the third node; and receive, by using the determined receive beam according to an indication of the processor, a reference signal used for interference measurement.

The processor 1904 is configured to: determine, according to the interference measurement type indication in the interference measurement configuration message, that a receive beam used for detecting the reference signal is the receive beam of the second functional entity of the third node, and indicate the transceiver to receive, by using the determined receive beam, the reference signal used for interference measurement.

Further, the interference measurement configuration message further includes reference signal resource indication information of a second functional entity of a second node, and the reference signal resource indication information of the second functional entity of the second node includes one or a combination of the following: a reference signal resource identifier of the second functional entity of the second node, transmit power of the RS that is of the second functional entity of the second node and that is used for interference measurement, a time-frequency resource location to which the RS that is of the second functional entity of the second node and that is used for interference measurement is mapped, or a sending periodicity of the RS that is of the second functional entity of the second node and that is used for interference measurement.

Further, the processor is further configured to: determine, according to the reference signal resource indication information in the interference measurement configuration message, a time-frequency resource indicated in the interference measurement configuration message, and indicate the transceiver to receive, on the determined time-frequency resource, the reference signal used for interference measurement.

The interference measurement apparatus is configured to perform the interference measurement methods shown in FIG. 8a, FIG. 8b, and FIG. 9. Related technical features have been described in detail above with reference to the methods shown in FIG. 8a, FIG. 8b, and FIG. 9. Therefore, details are not described herein again. It should be noted that, in the interference measurement methods shown in FIG. 4a, FIG. 4b, and FIG. 5 apparatus is configured to perform that may be implemented by the interference measurement apparatus methods shown in FIG. 4a, FIG. 4b, and FIG. 5. For, each of the nodes in Embodiment 1, for example, the first node, the second node, and the third node, includes a transceiver and a processor, a sending or receiving action of each node in the method embodiment may be performed by the transceiver, and other actions such as processing and determining are performed by the processor.

Further, as described above, for the detection methods in FIG. 10 and FIG. 11 in Embodiment 4, this embodiment of the present disclosure is also applied to the foregoing apparatus structure. The apparatus includes a transceiver and a processor. A receiving or sending step of each node is performed by the transceiver of each node, and specific actions such as processing, determining, calculation, and judging are performed by the processor of each node. Details are not described herein again.

This application provides the foregoing interference measurement apparatus, so that an interfered node can quickly and accurately perform interference measurement, thereby greatly reducing impact of cross-link signal transmission and improving transmission performance of a system.

For a schematic diagram of a logical structure of another interference measurement apparatus in Embodiment 5 to Embodiment 7 of the present disclosure, refer to FIG. 18 and FIG. 19. No more graphical illustration is provided herein. In a specific implementation process, the interference measurement apparatus may be a network device or a relay device, and the relay device may be a base station. The interference measurement apparatus includes a transceiver and a processor.

Further, as described above, for the detection methods corresponding to FIG. 12 to FIG. 17 in Embodiment 5 to Embodiment 7, these embodiments can also be applied to the foregoing apparatus structure. A receiving or sending step of each node is performed by the transceiver of each node, and specific actions such as processing, determining, calculation, and judging are performed by the processor of each node. Details are not described herein again.

Figure 20:
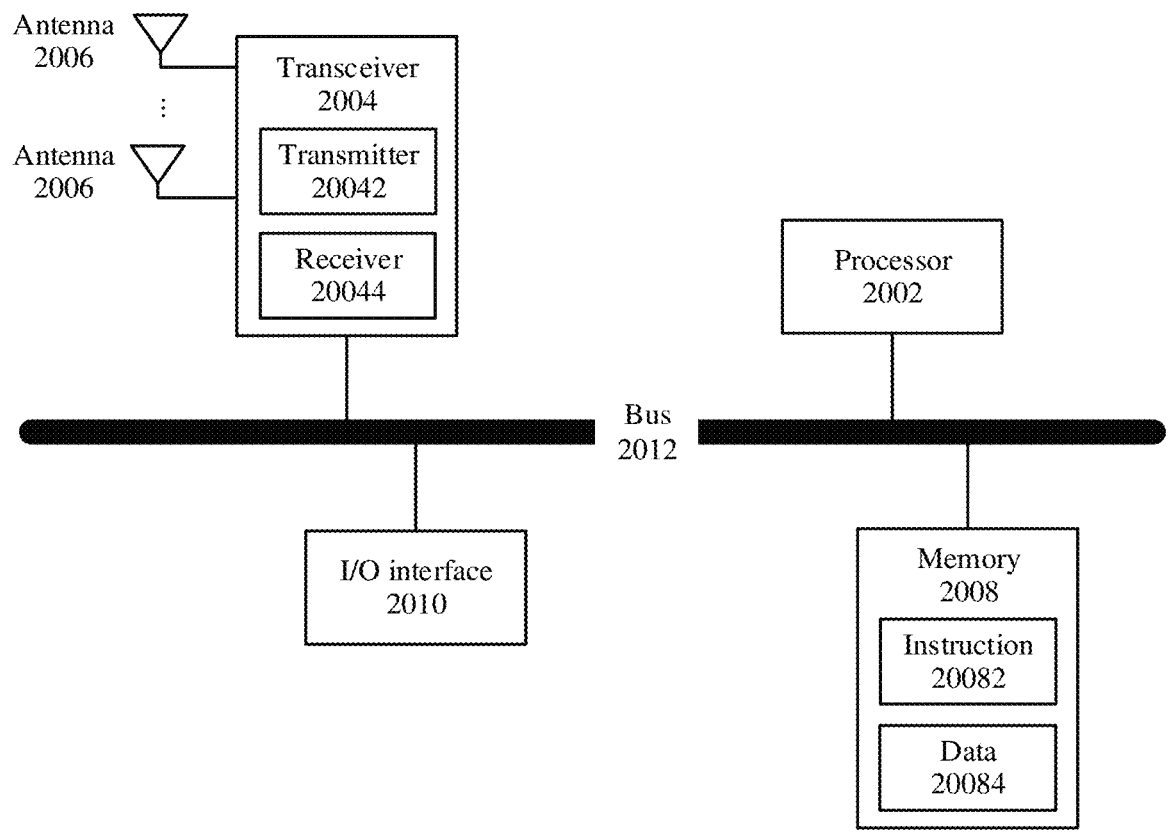
FIG. 20 is a schematic diagram of a hardware structure of a network device according to an embodiment of this application.

FIG. 20 is a schematic diagram of a hardware structure of a relay node according to Embodiment 1 to Embodiment 7 of the present disclosure. As shown in FIG. 16, a network device includes a processor 2002, a transceiver 2004, a plurality of antennas 2006, a memory 2008, an I/O (input/output, Input/Output) interface 2010, and a bus 2012. The transceiver 2004 further includes a transmitter 20042 and a receiver 20044. The memory 2008 is further configured to store an instruction 20082 and data 20084. In addition, the processor 2002, the transceiver 2004, the memory 2008, and the I/O interface 2010 are communicatively connected to each other through the bus 2012. The plurality of antennas 2006 are connected to the transceiver 2004.

The processor 2002 may be a general purpose processor, for example, but not limited to, a central processing unit (CPU), or may be a dedicated processor, for example, but not limited to, a digital signal processor (DSP), an application-specific integrated circuit (ASIC), and a field programmable gate array (FPGA). In addition, the processor 2002 may be alternatively a combination of a plurality of processors. Particularly, in the technical solution provided in this embodiment of the present disclosure, the processor 2002 may be configured to perform, for example, operations performed by the processing unit in FIG. 18 and FIG. 19 and operations performed in the method embodiments in Embodiment 1 to Embodiment 7. The processor 2002 may be a processor specifically designed for performing the foregoing steps and/or operations, or may be a processor that performs the foregoing steps and/or operations by reading and executing the instruction 20082 stored in the memory 2008. The processor 2002 may need to use the data 20084 in a process of performing the foregoing steps and/or operations.

The transceiver 2004 includes the transmitter 20042 and the receiver 20044. The transmitter 20042 is configured to send a signal by using at least one of the plurality of antennas 2006. The receiver 20044 is configured to receive a signal by using at least one of the plurality of antennas 2006. Particularly, in the technical solution provided in this embodiment of the present disclosure, the transmitter 20042 may be specifically configured to perform, by using at least one of the plurality of antennas 2006, for example, the operations performed by the processing unit in FIG. 18 and FIG. 19 and the operations performed by the transceiver unit in the operations performed in the method embodiments in Embodiment 1 to Embodiment 5.

The memory 2008 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 2008 is specifically configured to store the instruction 20082 and the data 20084. The processor 2002 may perform the foregoing steps and/or operations by reading and executing the instruction 20082 stored in the memory 2008, and may need to use the data 20084 in the process of performing the foregoing operations and/or steps.

The I/O interface 2010 is configured to receive an instruction and/or data from a peripheral device, and output an instruction and/or data to the peripheral device.

It should be noted that in a specific implementation process, the relay node may further include other hardware components, which are not listed by way of example one by one in this specification.

The hardware structural diagram of the node device may be a hardware structural diagram of a network device in the operations performed by the processing unit in FIG. 18 and FIG. 19 and the operations performed in the method embodiments in Embodiment 1 to Embodiment 5.

An embodiment of the present disclosure provides an interference measurement apparatus, and the apparatus may be further configured to perform the method in any one of Embodiment 1 to Embodiment 7.

An embodiment of the present disclosure further provides a computer readable storage medium, including instructions. When the instructions are executed on a computer, the computer is enabled to perform the method in any one of Embodiment 1 to Embodiment 7.

An embodiment of the present disclosure further provides a computer program product. The computer program product includes computer program code, and when the computer program code is executed on a computer, the computer is enabled to perform the method in any one of Embodiment 1 to Embodiment 7.

An embodiment of the present disclosure further provides a chip, including a memory and a processor. The memory is configured to store a computer program, and the processor is configured to invoke the computer program from the memory and run the computer program, so that the processor performs the method in any one of Embodiment 1 to Embodiment 7.

The solutions of the foregoing methods and apparatuses provided in the embodiments of the present disclosure may be implemented in a manner of a processor and a transceiver. The processor is configured to perform various processing operations, for example, but not limited to, operations such as generation, determining, judging, searching, extraction, obtaining, reading, receiving of input to-be-processed data, and outputting of processed data, and the transceiver is configured to perform operations such as transmitting and receiving. In a specific implementation process, the processor may be implemented in the following manners:

In a first manner, the processor is a dedicated processor. In this case, the processor may further include an interface circuit and a processing circuit. The interface circuit is configured to: receive data that needs to be processed by the processing circuit, and output a processing result of the processing circuit, and the processing circuit is configured to perform the foregoing various processing operations.

In a second manner, the processor is implemented by using an architecture of a general purpose processor and a memory. The general purpose processor is configured to execute processing instructions stored in the memory, and the processing instructions are used to indicate the general purpose processor to perform the foregoing various processing operations. It can be understood that processing performed by the general purpose processor depends on the processing instruction stored in the memory, and the general purpose processor may be controlled, by modifying the processing instruction in the memory, to output different processing results.

Further, in the second manner, the general purpose processor and the memory may be integrated on a same chip. For example, both the general purpose processor and the memory may be integrated on a processing chip. In addition, the general purpose processor and the memory may be alternatively disposed on different chips. For example, the general purpose processor is disposed on a processing chip, and the memory is disposed on a storage chip.

The technical solutions provided in the embodiments of the present disclosure may be alternatively implemented in a manner of a computer readable storage medium. The computer readable storage medium stores processing instructions for implementing the technical solutions in the embodiments of the present disclosure, to be read by a general-purpose processing device to complete the technical solutions provided in the embodiments of the present disclosure. It should be understood that the general-purpose processing device is a processing device including necessary hardware components such as a processor and a transceiver. Operations of these hardware components depend on the processing instructions stored in the computer readable storage medium.

All or some of the foregoing embodiments may be implemented by using software, hardware, firmware, or any combination thereof. When software is used to implement the embodiments, all or part of the embodiments may be implemented in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

To sum up, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method, comprising:
receiving, by a first functional entity of a third node from a first node, an interference measurement configuration message, wherein the interference measurement configuration message comprises interference measurement type indication information, and the interference measurement type indication information indicates to the first functional entity of the third node to perform interference measurement by using a receive beam of a second functional entity of the third node, and wherein an integrated access and backhaul (IAB) network comprises at least the first node, a second node, and the third node;
determining, by the first functional entity of the third node based on an interference measurement type indication comprised in the interference measurement configuration message, that the receive beam of the second functional entity of the third node is usable for detecting a reference signal;
receiving, by the first functional entity of the third node using the receive beam of the second functional entity of the third node, the reference signal from the second node, the reference signal usable for interference measurement; and
performing, by the first functional entity of the third node, the interference measurement,
wherein the first node is an upper-level node of the third node, and the second node is an interference source node of the third node.

2. The method according to claim 1, wherein the interference measurement configuration message further comprises reference signal resource indication information of a second functional entity of the second node, and the reference signal resource indication information of the second functional entity of the second node comprises one or a combination of:
- a reference signal resource identifier of the second functional entity of the second node;
  - transmit power of the reference signal of the second functional entity of the second node that is usable for interference measurement, and a time-frequency resource location to which the reference signal of the second functional entity of the second node that is usable for interference measurement is mapped; or
- a transmission periodicity of the reference signal of the second functional entity of the second node that is usable for interference measurement.

3. The method according to claim 2, further comprising:
determining, based on the reference signal resource indication information comprised in the interference measurement configuration message, a time-frequency resource indicated in the interference measurement configuration message; and
wherein receiving, by the first functional entity using the receive beam of the second functional entity, the reference signal usable for interference measurement, comprises:
receiving, by the first functional entity using the receive beam of the second functional entity and on the determined time-frequency resource, the reference signal usable for interference measurement.

4. The method according to claim 2, wherein the reference signal resource identifier is a resource identifier of a channel state information-reference signal or a resource identifier of a sounding reference signal.

5. The method according to claim 1, wherein receiving, by the first functional entity of the third node, the interference measurement configuration message comprises:
receiving, by the first functional entity of the third node from the first node, the interference measurement configuration message.

6. The method according to claim 1, wherein the interference measurement configuration message is carried in a radio resource control protocol message or a media access control control element.

7. The method according to claim 1, wherein the first functional entity of the third node is a mobile termination entity of the third node.

8. An apparatus, comprising:
a transceiver, configured to:
receive an interference measurement configuration message from a first node, wherein the interference measurement configuration message comprises interference measurement type indication information, and the interference measurement type indication information indicates to a first functional entity of a third node to perform interference measurement by using a receive beam of a second functional entity of the third node; and
a processor, configured to:
determine, based on an interference measurement type indication in the interference measurement configuration message, that the receive beam of the second functional entity of the third node is usable for detecting a reference signal;
indicate to the transceiver to receive, using the receive beam of the second functional entity of the third node, the reference signal usable for interference measurement; and
perform, by the first functional entity of the third node, the interference measurement,
wherein the transceiver is further configured to receive, using the receive beam of the second functional entity of the third node, the reference signal from a second node, the reference signal usable for interference measurement,
wherein the first node is an upper-level node of the third node, and the second node is an interference source node of the third node.

9. The apparatus according to claim 8, wherein the interference measurement configuration message further comprises reference signal resource indication information of a second functional entity of the second node, and the reference signal resource indication information of the second functional entity of the second node comprises one or a combination of:
a reference signal resource identifier of the second functional entity of the second node;
transmit power of the reference signal of the second functional entity of the second node and that is usable for interference measurement, and a time-frequency resource location to which the reference signal of the second functional entity of the second node that is usable for interference measurement is mapped; or
a transmission periodicity of the reference signal of the second functional entity of the second node that is usable for interference measurement.

10. The apparatus according to claim 9, wherein the processor is further configured to:
determine, based on the reference signal resource indication information in the interference measurement configuration message, a time-frequency resource indicated in the interference measurement configuration message; and
wherein the processor being configured to indicate to the transceiver to receive, using the receive beam of the second functional entity of the third node, the reference signal usable for interference measurement, comprises the processor being configured to:
indicate to the transceiver to receive, using the receive beam of the second functional entity of the third node and on the determined time-frequency resource, the reference signal usable for interference measurement.

11. The apparatus according to claim 9, wherein the reference signal resource identifier is a resource identifier of a channel state information-reference signal or a resource identifier of a sounding reference signal.

12. The apparatus according to claim 8, wherein the transceiver being configured to receive the interference measurement configuration message comprises the transceiver being configured to:
receive, from the first node in an integrated access and backhaul (IAB) network, the interference measurement configuration message.

13. The apparatus according to claim 8, wherein the interference measurement configuration message is carried in a radio resource control protocol message or a media access control control element.

14. The apparatus according to claim 8, wherein the apparatus is a mobile termination apparatus of an integrated access and backhaul (IAB) node.

15. A non-transitory computer-readable storage medium, comprising instructions, which when executed on a third node, cause the third node to:
receive an interference measurement configuration message from a first node, wherein the interference measurement configuration message comprises interference measurement type indication information, and the interference measurement type indication information indicates to a first functional entity of the third node to perform interference measurement using a receive beam of a second functional entity of the third node;

determine, based on an interference measurement type indication information in the interference measurement configuration message, that the receive beam of the second functional entity of the third node is usable for detecting a reference signal; and receive, using the receive beam of the second functional entity of the third node, the reference signal from a second node, the reference signal usable for interference measurement; and perform, by the first functional entity of the third node, the interference measurement, wherein the first node is an upper-level node of the third node, and the second node is an interference source node of the third node.

16. The non-transitory computer-readable storage medium according to claim 15, wherein the interference measurement configuration message further comprises reference signal resource indication information of a second functional entity of the second node, and the reference signal resource indication information of the second functional entity of the second node comprises at least one of:

a reference signal resource identifier of the second functional entity of the second node;

transmit power of the reference signal of the second functional entity of the second node that is usable for interference measurement, and a time-frequency resource location to which the reference signal of the second functional entity of the second node that is usable for interference measurement is mapped; or a transmission periodicity of the reference signal of the second functional entity of the second node that is usable for interference measurement.

17. The non-transitory computer-readable storage medium according to claim 16, wherein when the instructions are executed, the third node is further caused to:

determine, based on the reference signal resource indication information in the interference measurement configuration message, a time-frequency resource indicated in the interference measurement configuration message; and wherein receiving, using the receive beam of the second functional entity of the third node, the reference signal usable for interference measurement, comprises:

receiving, using the receive beam of the second functional entity of the third node on the determined time-frequency resource, the reference signal usable for interference measurement.

18. The non-transitory computer-readable storage medium according to claim 16, wherein the reference signal resource identifier is a resource identifier of a channel state information-reference signal or a resource identifier of a sounding reference signal.

19. The non-transitory computer-readable storage medium according to claim 15, wherein when the instructions are executed, the third node being caused to receive the interference measurement configuration message comprises the third node being caused to:

receive, from the first node in an integrated access and backhaul (LAB) network, the interference measurement configuration message.

20. The non-transitory computer-readable storage medium according to claim 15, wherein the interference measurement configuration message is carried in a radio resource control protocol message or a media access control control element.

* * * * *

UNITED STATES PATENT AND TRADEMARK OFFICE
CERTIFICATE OF CORRECTION

| | | |
|---|---|---|
| PATENT NO. | : 12,143,839 B2 | Page 1 of 1 |
| APPLICATION NO. | : 17/213999 | |
| DATED | : November 12, 2024 | |
| INVENTOR(S) | : Ye et al. | |

It is certified that error appears in the above-identified patent and that said Letters Patent is hereby corrected as shown below:

In the Claims

In Column 46, in Claim 19, Line 29, delete "(LAB)" and insert -- (IAB) --.

Signed and Sealed this
Thirty-first Day of December, 2024

Derrick Brent
*Acting Director of the United States Patent and Trademark Office*